(12) United States Patent
Mangette et al.

(10) Patent No.: US 9,868,445 B2
(45) Date of Patent: Jan. 16, 2018

(54) DIAGNOSTIC SUPERVISOR TO DETERMINE IF A TRACTION SYSTEM IS IN A FAULT CONDITION

(71) Applicant: Crown Equipment Corporation, New Bremen, OH (US)

(72) Inventors: Stephen T. Mangette, Delphos, OH (US); Joe K. Hammer, St. Marys, OH (US); Brent A. Barnhart, Van Wert, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 15/234,152

(22) Filed: Aug. 11, 2016

(65) Prior Publication Data

US 2017/0043787 A1 Feb. 16, 2017

Related U.S. Application Data

(60) Provisional application No. 62/205,092, filed on Aug. 14, 2015.

(51) Int. Cl.
*A01B 69/00* (2006.01)
*B62D 6/00* (2006.01)
(Continued)

(52) U.S. Cl.
CPC ........ *B60W 50/0205* (2013.01); *B60W 30/02* (2013.01); *B60W 40/10* (2013.01);
(Continued)

(58) Field of Classification Search
CPC .. B60W 30/02; B60W 40/10; B60W 50/0098; B60W 50/0205
See application file for complete search history.

(56) References Cited

U.S. PATENT DOCUMENTS

| 4,595,433 A | 6/1986 | Ford et al. |
| 4,942,529 A | 7/1990 | Avitan et al. |

(Continued)

FOREIGN PATENT DOCUMENTS

| DE | 4311485 A1 | 10/1994 |
| DE | 19702313 C1 | 4/1998 |

(Continued)

OTHER PUBLICATIONS

Janusch, Stefan; International Search Report and Written Opinion; International Application No. PCT/US2016/044981; Nov. 9, 2016; European Patent Office; Rijswijk, Netherlands.
Plenk, Rupert; International Search Report and Written Opinion; International Application No. PCT/US2016/046456; Nov. 25, 2016; European Patent Office; Rijswijk, Netherlands.

(Continued)

*Primary Examiner* — Rachid Bendidi
(74) *Attorney, Agent, or Firm* — Stevens & Showalter LLP

(57) ABSTRACT

A steering application executing on a vehicle control module receives a steering control input to control a steered wheel of a vehicle. Based on the steering control input, the steering application determines a traction threshold value associated with a traction control attribute related to a traction wheel of the vehicle. A first diagnostic supervisor executing on the vehicle control module receives a measured value of the traction control attribute and the traction threshold value. When the measured value of the traction control attribute exceeds the traction threshold value, the first diagnostic supervisor repeatedly calculates a respective difference between the traction threshold value and the measured value of the traction control attribute to generate a set comprising a plurality of the respective differences. Based on the plurality of respective differences, the first diagnostic supervisor determines a first operating condition of a traction system of the vehicle.

22 Claims, 17 Drawing Sheets

(51) Int. Cl.
| | |
|---|---|
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |
| *B60W 50/02* | (2012.01) |
| *G07C 5/08* | (2006.01) |
| *B60W 30/02* | (2012.01) |
| *B60W 50/00* | (2006.01) |
| *B60W 50/04* | (2006.01) |
| *G05D 1/02* | (2006.01) |
| *B60W 40/10* | (2012.01) |
| *B66F 9/06* | (2006.01) |
| *B66F 9/075* | (2006.01) |

(52) U.S. Cl.
CPC ...... *B60W 50/0098* (2013.01); *B60W 50/045* (2013.01); *B66F 9/06* (2013.01); *B66F 9/07568* (2013.01); *G05D 1/0223* (2013.01); *G07C 5/0808* (2013.01); *B60W 2050/0037* (2013.01); *B60W 2050/021* (2013.01); *B60W 2300/121* (2013.01); *B60W 2510/20* (2013.01); *B60W 2520/10* (2013.01); *B60W 2520/26* (2013.01); *B60W 2520/28* (2013.01); *B60W 2540/10* (2013.01); *B60W 2540/18* (2013.01); *B60W 2720/24* (2013.01); *B60W 2720/26* (2013.01)

(56) References Cited

U.S. PATENT DOCUMENTS

| | | | |
|---|---|---|---|
| 5,258,914 | A | 11/1993 | Schmitt |
| 6,799,652 | B2 | 10/2004 | Nissen et al. |
| 6,807,471 | B2 | 10/2004 | Fujimori |
| 6,971,470 | B2 | 12/2005 | McGoldrick |
| 7,017,689 | B2 | 3/2006 | Gilliland et al. |
| 7,023,174 | B2 | 4/2006 | Fromme et al. |
| 7,025,157 | B2 | 4/2006 | Lindsay et al. |
| 7,165,643 | B2 | 1/2007 | Bozem et al. |
| 7,278,509 | B2 | 10/2007 | Schröder et al. |
| 7,568,547 | B2 | 8/2009 | Yamada et al. |
| 7,599,776 | B2 | 10/2009 | Sonderegger et al. |
| 7,661,493 | B2 | 2/2010 | Rose |
| 7,665,555 | B2 | 2/2010 | Rose et al. |
| 7,706,947 | B2 | 4/2010 | Bozem et al. |
| 7,784,880 | B2 | 8/2010 | Glaeske et al. |
| 7,849,955 | B2 | 12/2010 | Crabill et al. |
| 7,979,189 | B2 | 7/2011 | Nihei |
| 7,980,352 | B2 | 7/2011 | Wetterer et al. |
| 8,140,228 | B2 | 3/2012 | McCabe et al. |
| 8,172,033 | B2 | 5/2012 | Corbett et al. |
| 8,230,976 | B2 | 7/2012 | Baldini |
| 8,235,161 | B2 | 8/2012 | Passeri et al. |
| 8,395,491 | B2 | 3/2013 | Kümmel et al. |
| 8,412,431 | B2 | 4/2013 | Wetterer et al. |
| 8,463,511 | B2 * | 6/2013 | Uematsu ............... B60K 17/35 701/48 |
| 8,521,384 | B2 | 8/2013 | O'Connor et al. |
| 8,649,953 | B2 | 2/2014 | Sherman |
| 8,694,194 | B2 | 4/2014 | Waltz et al. |
| 8,718,890 | B2 | 5/2014 | Wetterer et al. |
| 8,731,785 | B2 | 5/2014 | McCabe et al. |
| 8,788,156 | B2 | 7/2014 | Nishimura |
| 8,886,378 | B2 | 11/2014 | Hammer et al. |
| 8,892,294 | B2 | 11/2014 | Waltz et al. |
| 8,918,263 | B2 * | 12/2014 | Zent .................... B60T 8/175 477/184 |
| 9,082,293 | B2 | 7/2015 | Wellman et al. |
| 9,421,963 | B2 | 8/2016 | Wetterer et al. |
| 2005/0027427 | A1 * | 2/2005 | Nagaya ............... B60K 28/16 701/84 |
| 2005/0162114 | A1 | 7/2005 | Makaran |
| 2006/0052927 | A1 | 3/2006 | Watanabe et al. |
| 2006/0065470 | A1 | 3/2006 | Manken et al. |
| 2006/0102397 | A1 | 5/2006 | Buck et al. |
| 2007/0007080 | A1 | 1/2007 | Manthey et al. |
| 2007/0175693 | A1 | 8/2007 | Krimbacher |
| 2009/0194358 | A1 * | 8/2009 | Corbett ............... B66F 9/07509 180/402 |
| 2012/0123614 | A1 | 5/2012 | Laws et al. |
| 2013/0138290 | A1 | 5/2013 | Falkenstein |
| 2013/0338886 | A1 * | 12/2013 | Callea ................ G06F 17/00 701/50 |
| 2014/0163804 | A1 | 6/2014 | Kaneko et al. |
| 2014/0188324 | A1 | 7/2014 | Waltz et al. |
| 2014/0195127 | A1 | 7/2014 | Hoffman |
| 2014/0277871 | A1 | 9/2014 | Goncalves et al. |
| 2014/0278021 | A1 | 9/2014 | Fackler et al. |
| 2015/0090507 | A1 | 4/2015 | Okada et al. |
| 2015/0096826 | A1 | 4/2015 | Eden et al. |
| 2015/0158522 | A1 | 6/2015 | Thayer |
| 2016/0016482 | A1 | 1/2016 | Lee |
| 2016/0160470 | A1 | 6/2016 | Kishimoto et al. |
| 2016/0264387 | A1 | 9/2016 | Yoon et al. |
| 2016/0272081 | A1 | 9/2016 | Lee |
| 2017/0015330 | A1 | 1/2017 | Armbruster et al. |
| 2017/0029023 | A1 | 2/2017 | Otterbein |

FOREIGN PATENT DOCUMENTS

| | | |
|---|---|---|
| DE | 10114600 A1 | 1/2002 |
| DE | 10204955 A1 | 8/2002 |
| DE | 10205632 A1 | 10/2002 |
| DE | 10204742 A1 | 7/2003 |
| DE | 10301435 A1 | 12/2003 |
| DE | 10358907 A1 | 7/2004 |
| DE | 102004001318 A1 | 8/2004 |
| DE | 10354663 A1 | 6/2005 |
| DE | 102004028828 A1 | 1/2006 |
| DE | 102005022089 A1 | 11/2006 |
| DE | 102006035863 A1 | 2/2008 |
| DE | 102006041254 A1 | 3/2008 |
| DE | 102006050506 A1 | 4/2008 |
| DE | 102010007615 A1 | 9/2010 |
| DE | 102009020157 A1 | 11/2010 |
| DE | 112009004544 T5 | 8/2012 |
| DE | 102011013248 A1 | 9/2012 |
| DE | 102012209788 A1 | 12/2013 |
| DE | 102013011883 A1 | 1/2015 |
| DE | 10355933 B4 | 4/2015 |
| EP | 0436567 B1 | 10/1992 |
| EP | 1089901 B1 | 1/2002 |
| EP | 1186459 A1 | 3/2002 |
| EP | 1281600 A2 | 2/2003 |
| EP | 1183579 B1 | 10/2004 |
| EP | 1607309 A2 | 12/2005 |
| EP | 1301387 B1 | 3/2006 |
| EP | 0930216 B1 | 7/2006 |
| EP | 1268257 B1 | 7/2006 |
| EP | 1360103 B1 | 8/2006 |
| EP | 1741615 A1 | 1/2007 |
| EP | 1325857 B1 | 5/2007 |
| EP | 1527980 B1 | 12/2009 |
| EP | 2218627 A1 | 8/2010 |
| EP | 1880919 B1 | 5/2011 |
| EP | 1594026 B1 | 7/2011 |
| EP | 2145812 B1 | 11/2011 |
| EP | 2404803 A1 | 1/2012 |
| EP | 1399344 B1 | 8/2012 |
| EP | 2164746 B1 | 8/2012 |
| EP | 2172359 B1 | 12/2012 |
| EP | 2551161 A2 | 1/2013 |
| EP | 2368785 B1 | 9/2013 |
| EP | 2483130 B1 | 11/2013 |
| EP | 2664515 A1 | 11/2013 |
| EP | 2674387 A1 | 12/2013 |
| EP | 2582564 B1 | 2/2014 |

(56) References Cited

FOREIGN PATENT DOCUMENTS

| | | | |
|---|---|---|---|
| EP | 2374692 | B1 | 3/2014 |
| EP | 2630023 | B1 | 5/2014 |
| EP | 2613986 | B1 | 8/2016 |
| FR | 2862594 | A1 | 5/2005 |
| GB | 2042217 | A | 9/1980 |
| GB | 2370819 | A | 7/2002 |
| GB | 2391848 | A | 2/2004 |
| GB | 2413547 | B | 6/2007 |
| GB | 2425996 | B | 1/2009 |
| JP | 11310399 | A | 11/1999 |
| JP | 2000142065 | A | 5/2000 |
| JP | 2003306160 | A | 10/2003 |
| JP | 2005253143 | A | 9/2005 |
| JP | 2010095354 | A | 4/2010 |
| JP | 2010195118 | A | 9/2010 |
| JP | 2013126868 | A | 6/2013 |
| JP | 5418705 | B2 | 2/2014 |
| KR | 100225961 | B1 | 10/1999 |
| KR | 2015004511 | A | 1/2015 |
| WO | 0202389 | A1 | 1/2002 |
| WO | 2004098941 | A1 | 11/2004 |
| WO | 2012032133 | A1 | 3/2012 |
| WO | 2013006742 | A1 | 1/2013 |
| WO | 2013033179 | A1 | 3/2013 |
| WO | 2014189877 | A1 | 11/2014 |
| WO | 2015178843 | A1 | 11/2015 |
| WO | 2015178845 | A1 | 11/2015 |

OTHER PUBLICATIONS

Plenk, Rupert; International Search Report and Written Opinion; International Application No. PCT/US2016/046460; Nov. 25, 2016; European Patent Office; Rijswijk, Netherlands.

Plenk, Rupert; International Search Report and Written Opinion; International Application No. PCT/US2016/046466; Nov. 25, 2016; European Patent Office; Rijswijk, Netherlands.

Stephen Mangette and Brent Barnhart; Specification and Drawings; U.S. Appl. No. 15/224,945, filed Aug. 1, 2016.

Stephen Mangette, Joe Hammer and Brent Barnhart; Specification and Drawings; U.S. Appl. No. 15/234,120, filed Aug. 11, 2016.

Stephen Mangette, Joe Hammer and Brent Barnhart; Specification and Drawings; U.S. Appl. No. 15/234,168, filed Aug. 11, 2016.

U.S. Appl. No. 62/445,889; entitled "Traction Speed Recovery Based on Steer Wheel Dynamic," filed Jan. 13, 2017 by Stephen T. Mangette.

U.S. Appl. No. 62/445,902; entitled "High Speed Straight Ahead Tiller Desensitization," filed Jan. 13, 2017 by Stephen Mangette.

Ryan J. Rink; Office Action; U.S. Appl. No. 15/234,168; dated Nov. 22, 2017; United States Patent and Trademark Office; Alexandria, Virginia.

Ryan J. Rink; Office Action; U.S. Appl. No. 15/234,120; dated Nov. 1, 2017; United States Patent and Trademark Office; Alexandria, Virginia.

Stephen Mangette; Specification and Drawings; U.S. Appl. No. 15/808,949, filed Nov. 10, 2017.

Stephen Mangette; Specification and Drawings; U.S. Appl. No. 15/808,962, filed Nov. 10, 2017.

* cited by examiner

DIAGNOSTIC SUPERVISOR TO DETERMINE IF A TRACTION SYSTEM IS IN A FAULT CONDITION

RELATED APPLICATION

This application is related to and claims the benefit of provisional patent application entitled "Model Based Diagnostics Based on Traction Model," Application Ser. No. 62/205,092, filed Aug. 14, 2015, the disclosure of which is incorporated by reference herein in their entirety.

FIELD OF THE INVENTION

The present invention relates generally to diagnostics of a materials handling vehicle, and, more particularly, to utilizing a traction model to perform diagnostics.

BACKGROUND OF THE INVENTION

Forklifts and other types of industrial vehicles are expected to operate under a variety of different conditions. Further, such vehicles typically include a number of different functional systems such as a traction system to control a travelling speed of the vehicle and a steering system to control a direction in which the vehicle travels.

For diagnostic purposes, it may be beneficial to monitor different attributes of one or more of the different functional systems while the vehicle is being operated.

BRIEF SUMMARY OF THE INVENTION

One aspect of the present invention relates to a method that includes receiving, by a traction application executing on a vehicle control module of a vehicle, a traction speed control input to control a traction wheel of the vehicle; and based on the traction speed control input, determining, by the traction application, a first setpoint value of a control attribute related to the traction wheel. The method also includes receiving, by a first diagnostic supervisor: a) a measured value of the control attribute related to the traction wheel, and b) the first setpoint value from the traction application; wherein the first diagnostic supervisor comprises a first model of a traction system of the vehicle. Based on the first setpoint value and the first model, the first diagnostic supervisor calculates a first virtual value of the control attribute related to the traction wheel; and determines a first operating condition of the traction system of the vehicle based on the first virtual value and the measured value of the control attribute related to the traction wheel. The traction system can include a traction control module and a traction motor and the traction application can transmit the first setpoint value to the traction control module.

Also, the method can include generating, by the traction application, a second setpoint value of the control attribute related to the traction wheel. There can also be a second diagnostic supervisor which receives a) the second setpoint value, from the traction application, and b) the measured value of the control attribute related to the traction wheel, from the traction control module; wherein the second diagnostic supervisor comprises a second model of the traction system of the vehicle. Based on at least the second setpoint value and the second model, the second diagnostic supervisor can calculate a second virtual value of the control attribute related to the traction wheel; and determine a second operating condition of the traction system of the vehicle based on the second virtual value and the measured value of the control attribute.

In particular, the control attribute related to the traction wheel can be one of a speed of the traction wheel, or a speed of a traction motor coupled with the traction wheel of the vehicle.

In accordance with another aspect, a steering application executing on the vehicle control module can receive: a) a steering control input to control a steered wheel of the vehicle; b) a measured value of a control attribute related to the steered wheel; and c) the measured value of the control attribute related to the traction wheel of the vehicle. Based on the steering control input, the measured value of the control attribute related to the steered wheel and the measured value of the control attribute related to the traction wheel, the steering application can determine a setpoint value of the control attribute related to the steered wheel. Also, based on the steering control input, the measured value of the control attribute related to the steered wheel and the measured value of the control attribute related to the traction wheel, the steering application can determine a target steering angle. Additionally, the steering application can calculate a wheel angle command based on the steering control input.

In addition to the steps described above, the steering application, can determine a traction speed limit based on the wheel angle command; and that the measured value of the control attribute related to the traction wheel of the vehicle is less than the traction speed limit. Afterwards, the steering application can set the setpoint value of the control attribute related to the steered wheel to equal the wheel angle command; and set the target steering angle to equal: a) the wheel angle command, when the wheel angle command is greater than the measured value of the control attribute related to the steered wheel, and b) the measured value of the control attribute related to the steered wheel, when the wheel angle command is less than or equal to the measured value of the control attribute related to the steered wheel.

Alternatively, the steering application can determine a) a traction speed limit based on the wheel angle command; b) a wheel angle limit based on the measured value of the control attribute related to the traction wheel; and c) that the measured value of the control attribute related to the traction wheel of the vehicle is more than or equal to the traction speed limit. Afterwards, the steering application can set the target steering angle to equal the wheel angle command; and set the setpoint value of the control attribute related to the steered wheel to equal one of: a) the wheel angle limit, when the wheel angle limit is between the measured value of the control attribute related to the steered wheel and the wheel angle command; b) the measured value of the control attribute related to the steered wheel, when the wheel angle limit is: i) not between the measured value of the control attribute related to the steered wheel and the wheel angle command; and ii) closer to the measured value of the control attribute related to the steered wheel than to the wheel angle command and c) the wheel angle command, when the wheel angle limit is: i) not between the measured value of the control attribute related to the steered wheel and the wheel angle command; and ii) closer to the wheel angle command than to the measured value of the control attribute related to the steered wheel.

Yet another aspect relates to the traction application generating a second setpoint value of the control attribute related to the traction wheel, based on the first setpoint value; and a second diagnostic supervisor which receives a)

the second setpoint value, from the traction application, and b) the measured value of the control attribute related to the traction wheel, from the traction control module; wherein the second diagnostic supervisor comprises a second model of the traction system of the vehicle. Based on the second setpoint value, a vehicle battery voltage, the measured value of the control attribute related to the traction wheel and the second model, the second diagnostic supervisor can calculate a second virtual value of the control attribute related to the traction wheel; and determine, based on the second virtual value and the measured value of the control attribute related to the traction wheel, a second operating condition of the traction system of the vehicle.

Another aspect of the present invention relates to a system that includes a first controller comprising: a first memory storing code executable by the first controller; and a first input configured to receive a traction speed control input to control a traction wheel of the vehicle. The executable code includes a traction application configured to, based on the traction speed control input, determine a first setpoint value of a control attribute related to the traction wheel. The executable code also includes a first diagnostic supervisor configured to receive a measured value of the control attribute related to the traction wheel, and the first setpoint value, from the traction application; wherein the first diagnostic supervisor comprises a first model of a traction system of the vehicle. The first diagnostic supervisor is also configured to calculate, based on the first setpoint value and the first model, a first virtual value of the control attribute related to the traction wheel; and determine, based on the first virtual value and the measured value of the control attribute related to the traction wheel, a first operating condition of the traction system of the vehicle.

Yet another aspect of the present invention relates to a method that includes receiving, by a steering application executing on a vehicle control module a steering control input to control a steered wheel of a vehicle; and based on the steering control input, determining, by the steering application a traction threshold value associated with a traction control attribute related to a traction wheel of the vehicle. The method also includes receiving by a first diagnostic supervisor executing on the vehicle control module a) a measured value of the traction control attribute; and b) the traction threshold value. When the measured value of the traction control attribute exceeds the traction threshold value, the first diagnostic supervisor repeatedly calculates a respective difference between the traction threshold value and the measured value of the traction control attribute; to generate a set comprising a plurality of the respective differences. Based on the plurality of respective differences, the first diagnostic supervisor can determine a first operating condition of a traction system of the vehicle. In particular, the first diagnostic supervisor, for each respective difference, can determine if the difference is greater than a difference threshold; and when the difference is greater than the difference threshold, incrementing a first counter value; and when the difference is less than or equal to the difference threshold, resetting the first counter to a first initial value. The method can also include determining a fault condition of the traction system has occurred when the first counter value is greater than a first counter threshold. The traction threshold value can, for example, include a traction speed limit.

In a particular embodiment, the first counter threshold and the difference threshold are based on response characteristics of the traction system to at least one operational input received by the vehicle.

Also, the method can include, for each respective difference: a) determining if the difference is greater than a difference threshold; and when the difference is greater than the difference threshold, incrementing a first counter value, and when the difference is less than or equal to the difference threshold, resetting the first counter to a first initial value; and b) determining if the difference is greater than an immediately preceding difference in the set of respective differences; and when the difference is greater than the immediately preceding difference, incrementing a second counter value; when the difference is less than or equal to the immediately preceding difference, resetting the second counter value to a second initial value. Thus, the method can include determining a fault condition of the traction system has occurred when either the first counter value is greater than a first counter threshold or the second counter value is greater than a second counter threshold.

In one particular embodiment, the first counter threshold, the second counter threshold and the difference threshold are based on response characteristics of the traction system to at least one operational input received by the vehicle.

As one alternative, the method can include, for each respective difference: a) determining if the difference is greater than a first difference threshold; when the difference is greater than the first difference threshold, incrementing a first counter value; and when the difference is less than or equal to the first difference threshold, resetting the first counter to a first initial value; and b) determining if the difference is greater than a second difference threshold; when the difference is greater than the second difference threshold, incrementing a second counter value; and when the difference is less than or equal to the second difference threshold, resetting the second counter to a second initial value. In particular, the method can include determining a fault condition of the traction system has occurred when either the first counter value is greater than a first counter threshold or the second counter value is greater than a second counter threshold.

Furthermore, the first counter threshold, the second counter threshold, the first difference threshold, and the second difference threshold are based on response characteristics of the traction system to at least one operational input received by the vehicle.

One further aspect of the present invention relates to a vehicle control system that includes a controller that has: a) a first input configured to receive a steering control input to control a steered wheel of a vehicle; b) a second input configured to receive a measured value of a traction control attribute related to a traction wheel of the vehicle; c) a third input configured to receive a traction speed control input to control the traction wheel of the vehicle; and d) a memory coupled with the controller and storing code executable by the controller. The executable code can include a steering application configured to receive a steering control input to control a steered wheel of a vehicle; and determine, based on the steering control input, a traction threshold value associated with a traction control attribute related to a traction wheel of the vehicle. The executable code can also include a diagnostic supervisor configured to a) receive a measured value of the traction control attribute, and the traction threshold value; b) repeatedly calculate, when the measured value of the traction control attribute exceeds the traction threshold value, a respective difference between the traction threshold value and the measured value of the traction control attribute, to generate a set comprising a plurality of the respective differences; and c) determine, based on the plurality of respective differences, a first operating condition of a traction system of the vehicle.

Still a further aspect of the present invention relates to a method that includes iteratively performing the following steps: a) receiving, by a steering application executing on a vehicle control module a steering control input to control a steered wheel of a vehicle; a measured value of a steering control attribute related to the steered wheel; and a measured value of a traction control attribute related to a traction wheel of the vehicle; b) based on the steering control input, the measured value of the steering control attribute and the measured value of the traction control attribute, determining, by the steering application a first setpoint value of the steering control attribute related to the steered wheel and a target steering angle of the steered wheel of the vehicle; c) receiving, by a traction application executing on the vehicle control module of the vehicle, a traction speed control input to control the traction wheel of the vehicle, and the target steering angle, from the steering application; and d) based on the traction speed control input and the target steering angle, determining, by the traction application a second setpoint value of the traction control attribute.

In particular, the steering control attribute can include a steered wheel angle or an angular velocity of a steering motor coupled with the steered wheel of the vehicle. The traction control attribute can, for example, be one of a speed of the traction wheel or a speed of a traction motor coupled with the traction wheel of the vehicle.

The method can also include the steering application calculating a wheel angle command based on the steering control input, determining a traction speed limit based on the wheel angle command, and determining that the measured value of the traction control attribute related to the traction wheel of the vehicle is less than the traction speed limit. The steering application can then set the first setpoint value to equal the wheel angle command; and set the target steering angle to equal a) the wheel angle command, when the wheel angle command is greater than the measured value of the steering control attribute, and b) the measured value of the steering control attribute, when the wheel angle command is less than or equal to the measured value of the first control attribute.

Alternatively, the method can include the steering application determining: a) a traction speed limit based on the wheel angle command; b) a wheel angle limit based on the measured value of the traction control attribute related to the traction wheel; and c) that the measured value of the traction control attribute related to the traction wheel of the vehicle is more than or equal to the traction speed limit. The steering application can then set the target steering angle to equal the wheel angle command; and set the first setpoint value to equal one of: a) the wheel angle limit, when the wheel angle limit is between the measured value of the steering control attribute and the wheel angle command; b) the measured value of the steering control attribute, when the wheel angle limit is i) not between the measured value of the steering control attribute and the wheel angle command; and ii) closer to the measured value of the steering control attribute than to the wheel angle command, and c) the wheel angle command, when the wheel angle limit is i) not between the measured value of the steering control attribute and the wheel angle command; and ii) closer to the wheel angle command than to the measured value of the steering control attribute.

A further aspect of the present invention relates to a system that includes a controller which comprises: a) a first input configured to receive a steering control input to control a steered wheel of a vehicle; b) a second input configured to receive a measured value of a steering control attribute related to the steered wheel; c) a third input configured to receive a measured value of a traction control attribute related to a traction wheel of the vehicle; and d) a fourth input configured to receive a traction speed control input to control the traction wheel of the vehicle. The controller also includes a memory coupled with the controller and storing code executable by the controller. The executable code can include a steering application and a traction application that iteratively perform: a) based on the steering control input, the measured value of the steering control attribute and the measured value of the traction control attribute, determining, by the steering application a first setpoint value of a steering control attribute related to the steered wheel of the vehicle and a target steering angle of the steered wheel of the vehicle; b) receiving, by the traction application a traction speed control input to control the traction wheel of the vehicle, and the target steering angle, from the steering application; and c) based on the traction speed control input and the target steering angle, determining, by the traction application a second setpoint value of the traction control attribute.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
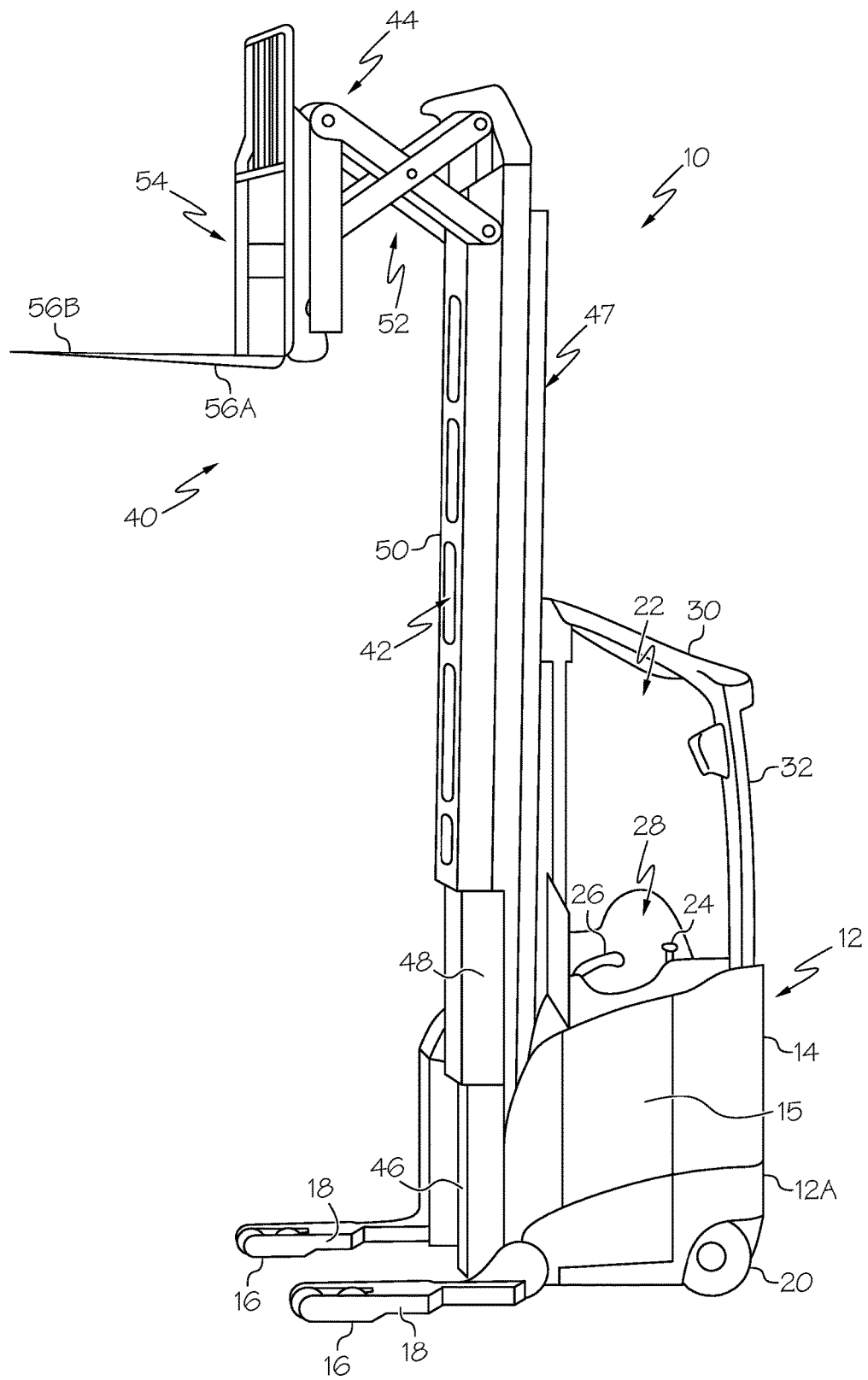
FIG. 1 is a perspective view of a materials handling vehicle according to an aspect of the present invention.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that the present invention may be used in a variety of other types of materials handling vehicles.

The vehicle 10 includes a main body or power unit 12, which includes a frame 14 defining a main structural component of the vehicle 10 and which houses a battery 15. The vehicle 10 further comprises a pair of fork-side support wheels 16 coupled to first and second outriggers 18, a driven and steered wheel 20 mounted near a first corner at a rear 12A of the power unit 12, and a caster wheel (not shown) mounted to a second corner at the rear 12A of the power unit 12. The wheels 16, 20 allow the vehicle 10 to move across a floor surface.

An operator's compartment 22 is located within the power unit 12 for receiving an operator driving the vehicle 10. A tiller knob 24 is provided within the operator's compartment 22 for controlling steering of the vehicle 10. The speed and direction of movement (forward or reverse) of the vehicle 10 are controlled by the operator via a multi-function control handle 26 provided adjacent to an operator seat 28, which control handle 26 may control one or more other vehicle functions as will be appreciated by those having ordinary skill in the art. The vehicle 10 further includes an overhead guard 30 including a vertical support structure 32 affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested first and second movable mast members 48, 50. It is noted that the mast assembly 42 may include additional or fewer movable mast members than the two shown in FIG. 1, i.e., the first and second movable mast members 48, 50. The carriage assembly 44 includes conventional structure including a reach assembly 52, a fork carriage 54, and fork structure comprising a pair of forks 56A, 56B. A movable assembly 47 as defined herein includes the lower and upper movable mast members 48, 50 and the carriage assembly 44. The mast assembly 42 may be configured as the monomast described in U.S. Pat. No. 8,714,311 to Steven C. Billger et al., granted on May 6, 2014 and assigned to the applicant, Crown Equipment Corporation, the entire disclosure of which is hereby incorporated by reference herein.

The vehicle 10 of FIG. 1 is provided by way of example and many different types of materials handling trucks are contemplated within the scope of the present invention. As described in detail below, aspects of a vehicle control module are provided which allow a number of identical components to be utilized on various vehicles even though the vehicles may be of different types.

Figure 2A:
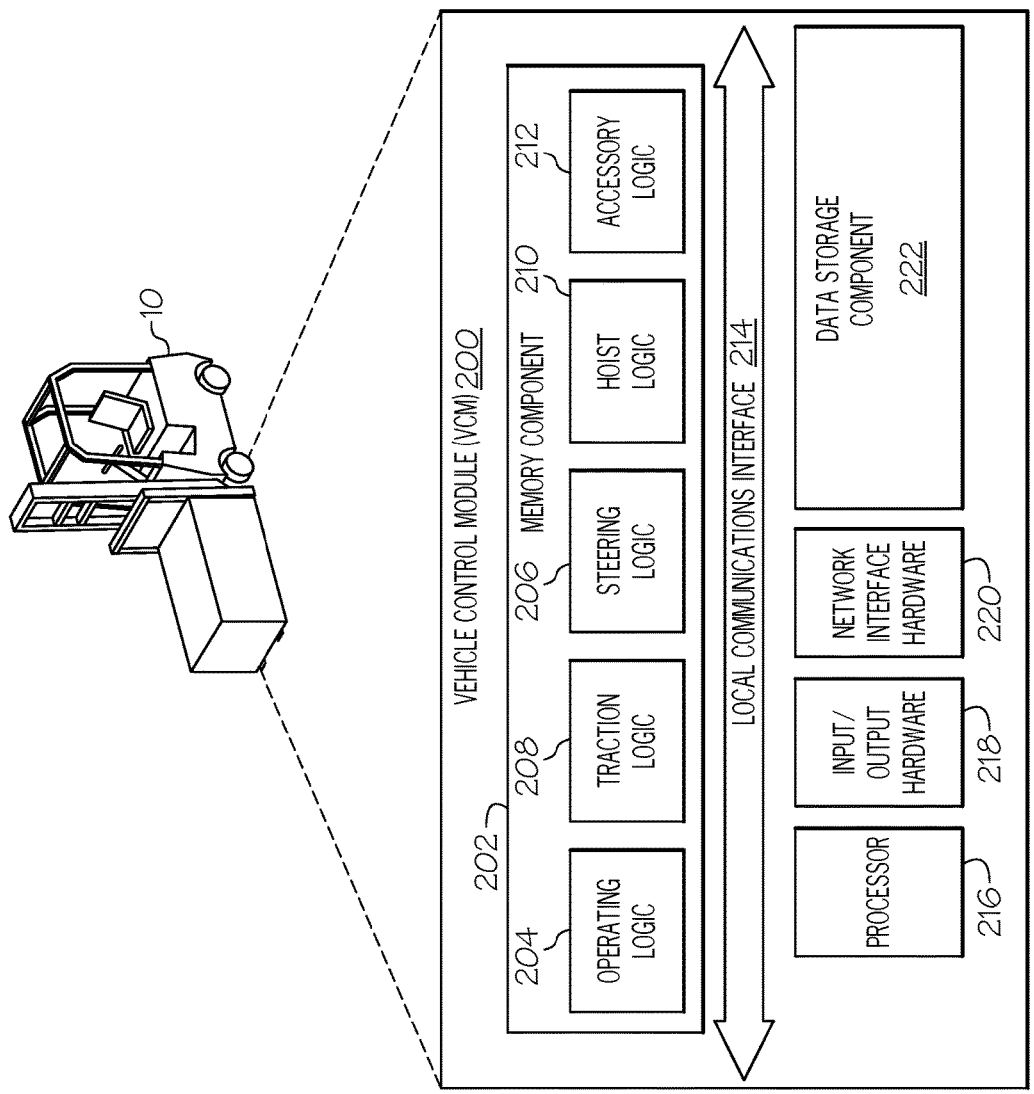
FIG. 2A depicts a computing environment for providing control logic in a vehicle control module (VCM) of the vehicle of FIG. 1.

FIG. 2A depicts a block-level view of a computing environment for providing control logic and software applications in a vehicle control module (VCM) 200, according to one or more embodiments shown and described herein. The vehicle control module 200 and the way it interfaces with various operator controls and other functional systems of the vehicle 10 may be similar to control structure disclosed in U.S. Patent Publication Nos. 2010/0228428 and 2014/0188324, the disclosures of which are incorporated herein by reference in their entireties. The VCM may comprise one of a number of cooperating modules, such as a traction control module (TCM) or a steering control module (SCM), that cooperatively control operation of the vehicle 10.

In the illustrated embodiment, the VCM 200 includes one or more processors or microcontrollers 216, input/output hardware 218, network interface hardware 220, a data storage component 222, and a memory component 202. The data storage component 222 and the memory component 202 may each be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Any stored information that is intended to be available after the vehicle 10 is shutdown and restarted may beneficially be stored in non-volatile memory. Also, depending on the particular embodiment, the non-transitory computer-readable medium, mentioned above, may reside within the VCM 200 and/or external to the VCM 200.

Additionally, the memory component 202 may store software or applications that can be executed (i.e., using executable code) by the one or more processors or microcontrollers 216. Thus the memory component 202 may store an operating application or logic 204, a traction application or logic 208, a steering application or logic 206, a hoist application or logic 210, and accessory application(s) or logic 212. The operating logic 204 may include an operating system and other software such as, for example, diagnostic-related applications for managing components of the VCM 200. The traction application or logic 208 may be configured with one or more algorithms and parameters for facilitating optimal traction control for the vehicle 10. The steering application or logic 206 may be configured with one or more algorithms and parameters for facilitating optimal steering control of the vehicle 10. The hoist application or logic 210 may include one or more algorithms and parameters for facilitating optimal hoist control of the vehicle 10, which acts as the primary load handling assembly system used to raise and lower the movable assembly 47 of the vehicle 10. Additionally, the accessory application or logic 212 may include one or more algorithms and parameters for providing control of accessories of the vehicle 10 such as an auxiliary load handling assembly system, which performs additional tasks such as tilt and sideshift of the carriage assembly 44. A local communication interface 214 is also included in FIG. 2A and may be implemented as a bus or other communication interface to facilitate communication among the components of the VCM 200.

The one or more processors or microcontrollers 216 may include any processing component operable to receive and execute instructions (such as from the data storage component 222 and/or the memory component 202). The processors or microcontrollers 216 may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" is also intended to encompass a combination of two or more of the above recited devices, e.g., two or more microcontrollers.

The input/output hardware 218 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 220 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 200 and other computing devices including other components coupled with a CAN bus or similar network on the vehicle 10.

It should be understood that the components illustrated in FIG. 2A are merely exemplary and are not intended to limit the scope of this disclosure. While the components in FIG. 2A are illustrated as residing within the VCM 200, this is merely an example. In some embodiments, one or more of the components may reside external to the VCM 200. It should also be understood that while the VCM 200 in FIG. 2A is illustrated as a single device; this is also merely an example. In some embodiments, the traction application 208, the steering application 206, the hoist application 210, and/or the accessory application 212 may reside on different devices. Additionally, while the VCM 200 is illustrated with the traction application 208, the steering application 206, the hoist application 210, and the accessory application 212 as separate logical components, this is also an example. In some embodiments, a single, composite software application may cause the VCM 200 to provide the described functionality.

It also should be understood that the VCM 200 may communicate with various sensors and other control circuitry of the vehicle 10 to coordinate the various conditions of manual operation and automatic operation of the vehicle 10.

In the description below, the following terms are used and are intended to convey the following definitions:

steering control input: sensor output signal values from the operator steering mechanism.

Wheel_Angle_Cmd: a value generated by the steering application and is a transformation of a digitized value of the steering control input into units that reflect an angle/angular velocity value.

Wheel_Angle_Target, or target steering angle $\theta_T$: based on the operator's input, this is a value generated by the steering application and provided to the traction application in order to calculate a second Trx_Speed_Limit$_2$. Depending on the current operation of a vehicle its value can be one of either the Wheel_Angle_Cmd or a Wheel_Angle.

Wheel_Angle_Limit: a highest allowable steered wheel angle, generated by the steering application based on the measured value of the traction wheel/motor speed and can be used to modify the Wheel_Angle_Setpoint in order to stay within a desired Wheel Angle-to-Traction Speed relationship.

Wheel_Angle_Setpoint, or steering setpoint $\omega_1$ or $\theta_1$: a value generated by the steering application, based on the operator's input, but modified based on traction speed, this is the input sent to the steering control module to effect a change in the steered wheel angle/angular velocity.

Steering feedback ($\omega_2$ or $\theta_2$), or Wheel_Angle: a measured value of the steered wheel angle/angular velocity, generated by the steering control module.

traction speed control input: a value received from a sensor/actuator that the operator manipulates.

Trx_Speed_Cmd: a value generated by the traction application and is a transformation of the digitized voltage reading of the traction speed control input into units that reflect a speed.

Figure 7A:
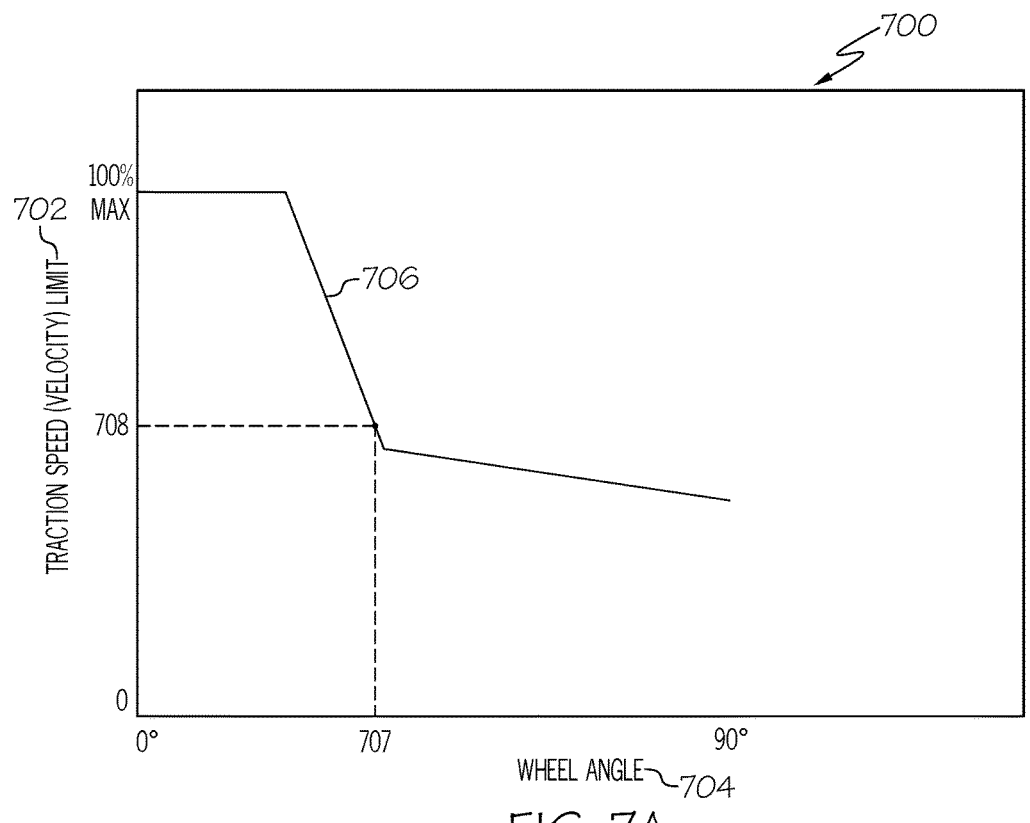
FIG. 7A-FIG. 7C illustrate different look up tables that can be used to calculate values for traction wheels and steered wheels in accordance with the principles of the present invention.

First Trx_Speed_Limit$_1$: a highest allowable traction wheel/motor speed for a particular wheel angle value, based on a desired wheel angle-to-traction speed relationship such as defined by the graph in FIG. 7A. The first Trx_Speed_Limit$_1$ is generated by the steering application and uses a Wheel_Angle_Cmd as a particular wheel angle value, see FIG. 7A. The first Trx_Speed_Limit$_1$ is used by the steering application to determine the Wheel_Angle_Target and the Wheel_Angle_Setpoint.

Second Trx_Speed_Limit$_2$: The second Trx_Speed_Limit$_2$ is generated by the traction application and uses Wheel_Angle_Target as the particular wheel angle value, see FIG. 7A. The second Trx_Speed_Limit$_2$ is used by the traction system to slow down the vehicle if necessary to stay within a desired Wheel Angle-to-Traction Speed relationship.

traction speed setting $\omega_4$: a value generated by the traction application, based on the operator's input, but modified based on the Trx_Speed_Limit$_2$; this velocity value will eventually be converted to a torque value by the traction application.

traction setpoint, $\tau_1$: a torque value based on the traction speed setting and the current speed of the vehicle, and is generated by the traction application.

Trx_Speed, or speed feedback, $\omega_3$: is a measured value of the traction wheel/motor speed, generated by the traction control module.

Figure 2B:
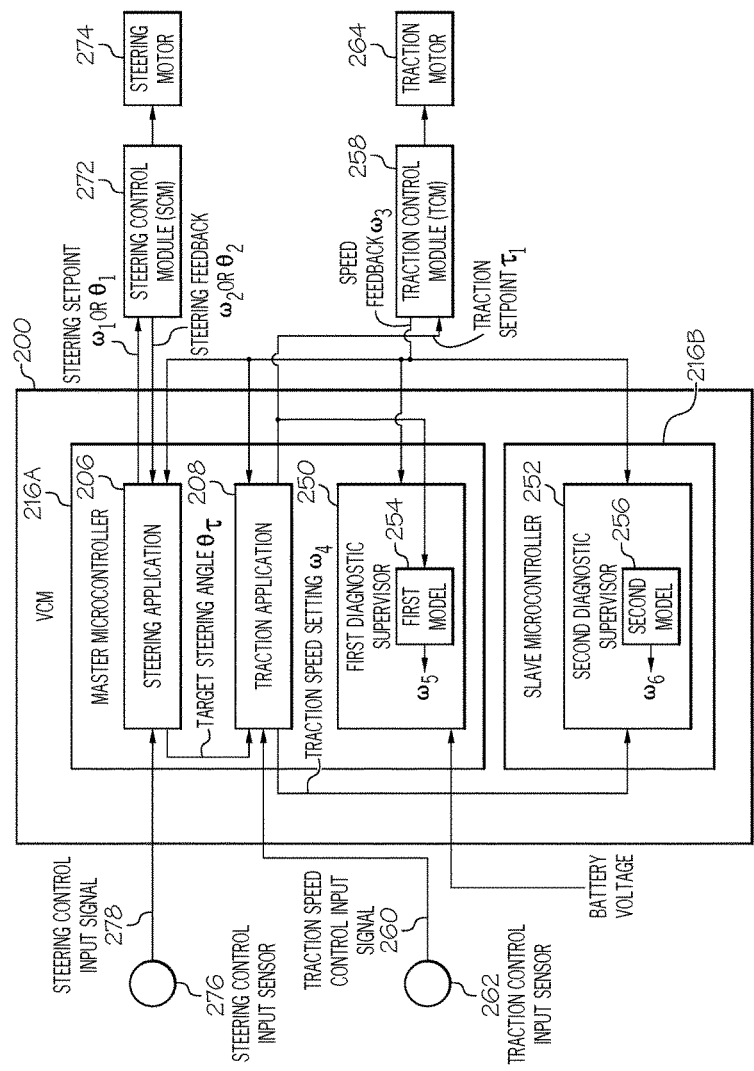
FIG. 2B schematically illustrates selected features of a vehicle and an example vehicle control module that are helpful in describing model-based diagnostic techniques that utilize a traction model in accordance with the principles of the present invention.

FIG. 2B schematically illustrates selected features of a vehicle 10 and an example vehicle control module 200 that are helpful in describing model-based diagnostic techniques that utilize a traction model. The other features of the vehicle 10 and the VCM 200 described with respect to FIG. 1 and FIG. 2A are omitted from FIG. 2B so as not to obscure aspects of the example model-based diagnostics described herein.

Referring to FIG. 2B, the VCM 200 includes a master microcontroller 216A that includes the steering application 206, the traction application 208 and a first diagnostic supervisor 250. The VCM 200 also includes a slave microcontroller 216B on which a second diagnostic supervisor 252 executes. A first simulation model 254 is contained in the first diagnostic supervisor 250 and a second simulation model 256 is contained within the second diagnostic supervisor 252.

In FIG. 2B, an operator-controlled steering control input sensor 276 forming part of a steering device comprising the tiller knob 24 of the vehicle 10 set out in FIG. 1, provides sensor output signal values defining a steering control input or steering control input signal 278 (e.g., an analog voltage) to the vehicle control module (VCM) 200. The steering control input sensor 276 may also form part of another steering device comprising a steering wheel, a control handle, a steering tiller or like steering element. The steering control input signal 278 may be adjusted or otherwise conditioned and may, for example, be provided to an input pin of a master microcontroller 216A within the VCM 200. That signal may be further conditioned and supplied as an input value to the steering application 206 that is being executed by the master microcontroller 216A. The voltage, for example, of the steering control input signal 278, or the rate of change of that voltage, can vary based on the position and the rate of change of position of the steering control input sensor 276 associated with the steering device, i.e., the tiller knob 24 in the illustrated embodiment. Based on the input signal the steering application 206 receives that corresponds to the steering control input signal 278, the steering application 206 determines a setpoint for a control attribute related to the steered wheel 20 of the vehicle. For example, a voltage value can be used along with a lookup table to correlate the voltage value to a particular wheel angle value for a steering setpoint or the rate of change of the voltage could be multiplied by a predetermined scaling factor to convert that rate of change into the setpoint that changes a steering motor angular velocity. Hence, the control attribute may, for example, be a steered wheel angle or an angular velocity of a steering motor 274 and, therefore, a value of the setpoint may be a steered wheel angle $\theta_1$ or a steering motor angular velocity $\omega_1$. The steering setpoint $\omega_1$ or $\theta_1$ can be provided to a steering control module (SCM) 272. The SCM 272 uses the setpoint $\omega_1$ or $\theta_1$ for controlling a steering motor 274 which positions the steered wheel 20 to conform to a desired position as indicated by the operator's manipulation of the steering control input sensor 276. The SCM 272 also provides a feedback value $\theta_2$ or $\omega_2$ of the control attribute related to the steered wheel. In particular, the feedback value is a measured, or actual, steered wheel angle $\theta_2$ of the steered wheel 20 or is a measured, or actual, angular velocity $\omega_2$ of the steering motor 274. The SCM 272 provides the feedback value $\theta_2$ or $\omega_2$ to the steering application 206.

The steering application 206 additionally produces the target steering angle $\theta_T$ or Wheel_Angle_Target which is provided to the traction application 208. As discussed below, with respect to FIGS. 4A-4D, a wheel angle/traction speed limiting process is performed by the steering application 206 and the traction application 208 wherein an output of the steering application 206 includes both:

a) the steering setpoint, or Wheel_Angle_Setpoint, $\omega_1$ or $\theta_1$ and b) the target steering angle, or Wheel_Angle_Target, $\theta_T$.

The target steering angle $\theta_T$ received at the traction application 208 from the steering application 206 serves as a limiting constraint that is converted by the traction application 208 to a traction control speed limit via a predetermined desired speed-to-wheel-angle relationship and is used in the determination of the desired traction speed setting $\omega_4$ and the traction setpoint $\tau_1$, comprising a torque value. The traction wheel speed, or a traction motor speed, can be considered a control attribute related to the traction wheel or driven wheel 20 of the vehicle 10 and the desired traction speed setting $\omega_4$, for either a traction motor 264 or the traction wheel 20, and the traction setpoint $\tau_1$, for the traction motor, can be considered to be respective setpoints for this control attribute related to the traction wheel.

The TCM 258 monitors the traction motor 264 and provides a traction feedback speed $\omega_3$ to the traction application 208, the steering application 206 and the two diagnostic supervisors 250, 252. Since the steering setpoint ($\theta_1$ or $\omega_1$) is partly dependent on the actual traction wheel or motor speed, i.e., speed feedback $\omega_3$, the diagnostic supervisors 250, 252 can verify that the actual traction speed $\omega_3$ is responding correctly to the traction setpoint $\tau_1$. The traction speed, or speed feedback, $\omega_3$ could also be converted to an actual linear speed of the vehicle 10 by the traction application 208. If, for example, the speed feedback $\omega_3$ was an angular speed of the traction motor 264, then the traction application 208 could scale that value to an actual linear speed, $v_3$, of the vehicle 10 based on a) a gearing ratio between the traction motor 264 and the driven wheel 20 and b) the circumference of the driven wheel 20. Alternatively, if the speed feedback $\omega_3$ was an angular speed of the driven wheel 20, then the traction application 208 could scale that value to an actual linear speed, $v_3$, of the vehicle 10 based on the circumference of the driven wheel 20. The linear speed of the vehicle equals the linear speed of the driven wheel 20, presuming there is no slip at the driven wheel. As explained more fully below, the traction application 208 can provide the value of the actual linear speed, or linear speed feedback, $v_3$ to the diagnostic supervisors 250, 252 in some embodiments. Providing the linear speed feedback $v_3$ to the diagnostic supervisors 250, 252 could be performed as an alternative to, or in addition to, the TCM 258 providing the speed feedback $\omega_3$, as shown in FIG. 2B.

The first simulation model 254 is configured to compute a virtual response $\omega_5$ of the vehicle speed, i.e., traction wheel speed or traction motor speed, under various conditions while under control of the traction control module (TCM) 258 via the traction setpoint $\tau_1$. In instances where the linear speed feedback $v_3$, rather than the angular speed feedback $\omega_3$, is provided to the first diagnostic supervisor 250, the virtual response $\omega_5$ (whether it represents a traction wheel speed or a traction motor speed) can also be scaled to a virtual linear speed response $v_5$ by the first diagnostic supervisor 250. The traction setpoint $\tau_1$ is determined by the traction application 208 using a Trx_Speed_Cmd which is generated by the traction application 208 and is based on a traction speed control input or traction speed control input signal 260 received from an operator controlled traction speed control input sensor 262, such as the multi-function control handle 26 of the vehicle 10, and the target steering angle $\theta_T$ output from the steering application 206. The traction setpoint $\tau_1$ is output from the traction application 208 to the TCM 258 as a torque value which results in a corresponding speed of a traction motor 264 under the control of the TCM 258.

Based on the virtual response $\omega_5$ provided by the first model 254 and the speed feedback $\omega_3$ from the TCM 258, the first diagnostic supervisor 250 can perform a correlation computation to determine the degree of similarity of the predicted, or virtual, traction speed $\omega_5$ to the actual traction speed $\omega_3$. Alternatively, the first diagnostic supervisor 250 can perform a correlation computation to determine the degree of similarity of the predicted, or virtual, linear speed $v_5$ of the driven wheel and vehicle to the actual linear speed $v_3$. The first diagnostic supervisor 250 executes so as to provide the first model 254 with the setpoint $\tau_1$ value, a present voltage of the vehicle battery 15, and the speed feedback $\omega_3$ value as inputs in order to generate, or calculate, the virtual response $\omega_5$ as an output. The first model 254 is designed to accurately reflect or predict the behavior of the traction system, which traction system includes the traction control module 258, the traction motor 264 and a load that represents a reactive force of the traction or driven wheel 20 of the vehicle 10 whose speed is being changed by the traction motor 264. Hence, the virtual response $\omega_5$ should closely reflect the intended or desired speed of the traction wheel 20 or the traction motor 264 which is a result of the setpoint $\tau_1$ and other vehicle operating conditions being provided to the traction control module 258 of the presently operated vehicle. If the virtual response $\omega_5$ and the actual speed of the traction wheel 20 or the traction motor 264 differ significantly, then this is an indication that there may be a problem with the traction control module 258, the traction motor 264, and/or the determination of the setpoint values, $\tau_1$ or $\omega_4$.

Accordingly, the first diagnostic supervisor 250 can compare the feedback value $\omega_3$ with the virtual response $\omega_5$. As explained below, the first model 254 can be an empirically-based model that produces a predicted result based on the operating conditions of the vehicle 10. The virtual response $\omega_5$ can be compared to the measured, or feedback, value $\omega_3$ for verification of proper operation of the vehicle's traction system. If the comparison indicates that the two values differ by more than a predetermined threshold, then the first diagnostic supervisor 250 can generate a fault signal, indicating a fault condition is occurring. The VCM 200 can, in response to the fault signal, stop movement of the vehicle 10.

The second simulation model 256 is configured to compute a virtual response $\omega_6$ of the traction motor or driven wheel speed under various conditions while under control of the traction control module (TCM) 258 via a traction setpoint $\tau_1$. A traction speed setting or setpoint $\omega_4$ is determined by the traction application 208 using the input signal 260 received from the operator controlled traction speed control input sensor 262 and the target steering angle $\theta_T$ output from the steering application 206. The traction speed setting $\omega_4$ is also used by the traction application 208 along with a current or actual traction speed $\omega_3$ or Trx_Speed to calculate the traction setpoint $\tau_1$, as discussed below, which results in a corresponding speed of a traction motor 264 under the control of the TCM 258. The second model 256 can be a virtual traction system comprising the TCM 258, the traction motor 264, and a load that represents a reactive force of the traction wheel of the vehicle 10 whose speed is being changed by the traction motor 264.

While one example type of model is described in more detail below, the second model 256 can be of any type that simulates the behavior of the isolated traction system such that the model provides a predicted result of how the control attribute of the traction system should react, i.e., what its speed should equal, if the traction control module 258 is provided with a particular setpoint $\tau_1$ (or equivalently $\omega_4$).

The second diagnostic supervisor 252 executes so as to provide the model 256 with the traction speed setpoint $\omega_4$ value as an input in order to generate, or calculate, the virtual response $\omega_6$ as an output. Assuming that the model 256 accurately reflects the behavior of the isolated traction system, the virtual response $\omega_6$ should closely reflect the actual speed of the traction wheel 20 or the traction motor 264 (i.e., the speed feedback $\omega_3$) which is a result of the traction speed setpoint $\omega_4$ being used to calculate the setpoint $\tau_1$ that is provided to the traction control module 258 of the presently operated vehicle, presuming the traction system is operating properly.

Accordingly, the second diagnostic supervisor 252 can compare the feedback value $\omega_3$ with the virtual response $\omega_6$. As mentioned, the second model 256 is essentially a virtual traction system that produces a simulated response (i.e., the virtual response $\omega_6$) of the vehicle's traction system. The virtual response $\omega_6$ can be compared to the measured, or feedback, value $\omega_3$ for verification of proper operation of the vehicle's traction system. If the comparison indicates that the two values differ by more than a predetermined threshold, then the second diagnostic supervisor 252 can generate a fault signal, indicating a fault condition is occurring. The VCM 200 can, in response to the fault signal, stop movement of the vehicle. As described above with respect to the virtual response $\omega_5$, the output of the second model 256, i.e., the virtual response $\omega_6$, can be converted to a virtual linear speed response $v_6$ for comparison to the actual linear speed $v_3$ of the vehicle 20, when appropriate.

One of ordinary skill will recognize that the first model 254 and the second model 256 may be different types of models, as described above, or they can be the same type of model. In either case, a redundant diagnostic system is provided that monitors the operating conditions of the traction system of the vehicle 10. While the description below focuses on the second diagnostic supervisor 252 and the second model 256, similar techniques can be utilized with the first diagnostic supervisor 250 and the first model 254.

Figure 3:
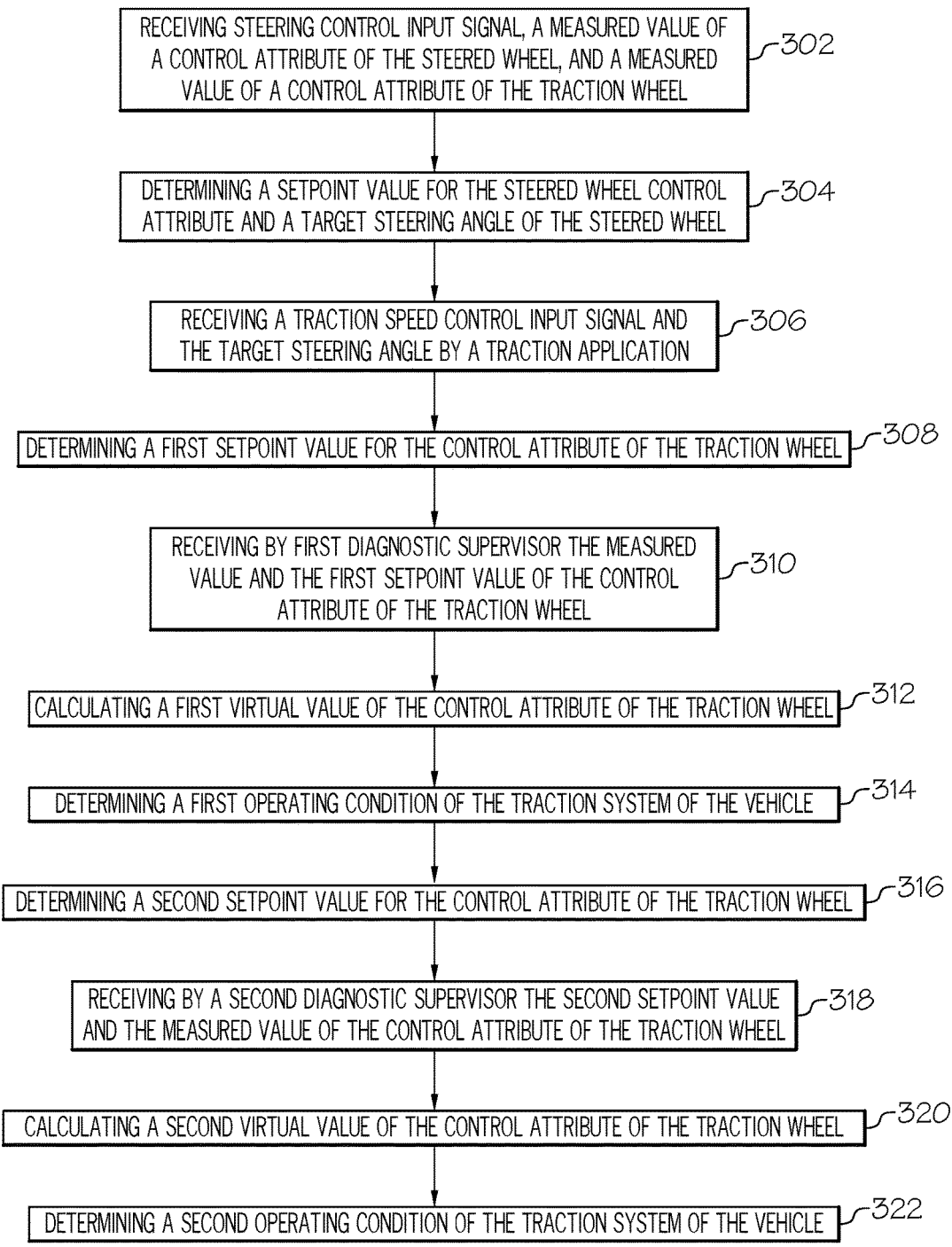
FIG. 3 depicts a flowchart of an example algorithm for performing model-based diagnostics of a vehicle traction system in accordance with the principles of the present invention.

FIG. 3 depicts a flowchart of an example algorithm for performing steering application calculations, traction application calculations, and model-based diagnostics of a vehicle traction system in accordance with the principles of the present invention.

In step 302, the steering application 206, which is executing on the vehicle control module, receives a steering control input signal 278 to control a steered wheel of a vehicle and a measured, feedback value $\theta_2$, $\omega_2$ of a first control attribute related to the steered wheel, such as a steered wheel angle or a steering motor angular velocity. The steering application also receives a measured, feedback value $\omega_3$ of a second control attribute related to a traction wheel of the vehicle, such as a traction wheel speed or a traction motor speed.

Then, based on the steering control input signal, the measured value of the first control attribute and the measured value of the second control attribute, the steering application determines, in step 304, a first setpoint value $\theta_1$, $\omega_1$ of the first control attribute related to the steered wheel, and a target steering angle $\theta_T$ of the steered wheel.

In step 306, the traction application 208, which is executing on the vehicle control module, receives a traction speed control input signal 260 to control the traction wheel of the vehicle, the measured value $\omega_3$ of the second control attribute and the target steering angle $\theta_T$, from the steering application. Based on the traction speed control input signal, the measured value $\omega_3$ of the second control attribute, and the target steering angle, the traction application determines, in step 308, a second setpoint value $\tau_1$ or $\omega_4$ of the second control attribute.

There is also a first diagnostic supervisor 250 executing on the VCM and it receives, in step 310, the measured value $\omega_3$ of the second control attribute, and the second setpoint value (Ti or $\omega_4$); wherein the first diagnostic supervisor comprises a first model 254 of the traction system of the vehicle.

In step 312, based on the second setpoint value and the first model, the first diagnostic supervisor calculates a first virtual value $\omega_5$ or $\omega_6$ of the second control attribute related to the traction wheel and, in step 314, based on the first virtual value and the measured value of the second control attribute, the first diagnostic supervisor determines a first operating condition of the traction system of the vehicle.

In step 316 the traction application can generate a third setpoint value ($\omega_4$ or $\tau_1$) of the second control attribute. A second diagnostic supervisor 252 may also be executing on the VCM and receives, in step 318, the third setpoint value and the measured value $\omega_3$ of the second control attribute; wherein the second diagnostic supervisor comprises a second model 256 of the traction system of the vehicle.

In step 320, based on the third setpoint value and the second model, the second diagnostic supervisor calculates a second virtual value $\omega_6$ or $\omega_5$ of the second control attribute and, in step 322, based on the second virtual value and the measured value of the second control attribute, determines a second operating condition of the traction system of the vehicle.

As mentioned earlier, the steering application 206 and the traction application 208 operate in conjunction with one another to control a steered wheel angle and traction speed of the vehicle 10. A steering control input sensor 276 associated with a steering wheel or tiller knob can generate a steering control input signal 276 that varies according to an operator's manipulation of the apparatus. This signal can then be converted to a digital value which can be scaled and adjusted to represent a value that has units appropriate for either a steered wheel angle (e.g., units of degrees) or an angular velocity of the steering motor (e.g., units of RPM). For instance, such a value can be referred to as a Wheel_Angle_Cmd and represents the operator's desired wheel position or steering motor angular velocity. One priority of a steering system comprising the steering control input sensor 276, the steering application 206, the SCM 272, the steering motor 274 and the steered wheel 20 is to position the steered wheel to the desired operator setting indicated by the Wheel_Angle_Cmd. Because the Wheel_Angle can be adjusted very quickly by the steering system, this rapid positional change may produce operator instability. Therefore, it is desirable that the steering application 206 produces control that will achieve the Wheel_Angle_Cmd as quickly as possible and without significant delay while also, in appropriate circumstances, reducing the traction speed so as to achieve a desired Wheel Angle-to-Traction Speed relationship (one example of which is depicted in FIG. 7A) to maintain operator stability. Using the Wheel_Angle_Cmd and a current Trx_Speed, the steering application 206 can determine two limiting constraints: a first Trx_Speed_Limit$_1$ and a Wheel_Angle_Limit. Using these four values and the current Wheel_Angle, the steering application 206 determines the steering setpoint (Wheel_Angle_Setpoint) and the Wheel_Angle_Target. The Wheel_Angle_Setpoint is the value (i.e., $\omega_1$ or $\theta_1$) communicated to the SCM 272 for wheel angle position adjustment. The Wheel_Angle_Target is the target steering angle $\theta_T$ communicated to the traction application 208 for determination of the second Trx_Speed_Limit$_2$ value.

Figure 7B:
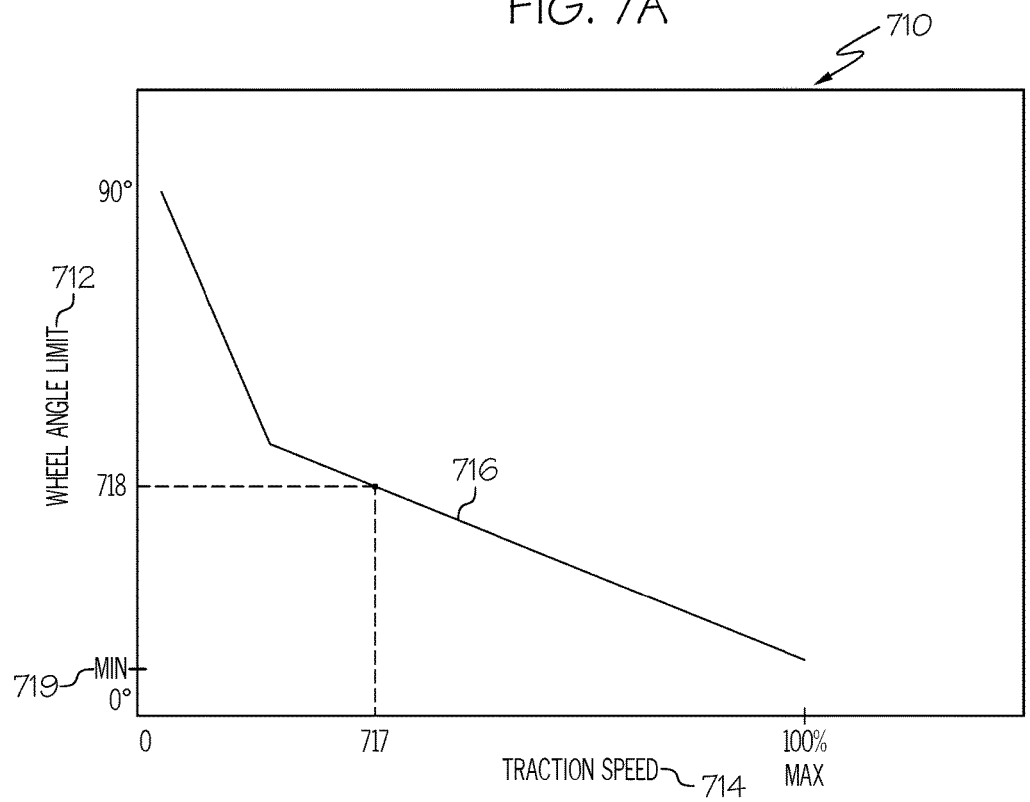

Even though the operator's input may result in a Wheel_Angle_Cmd indicating that the operator desires the steered wheel to have an angle x, the steering system can position the steered wheel per the operator command as quickly as possible without operator perceived delay, but in order to maintain operator stability, the steering application 206 of the VCM 200 may not immediately issue the new command x to the SCM 272 based on the traction wheel/motor speed feedback or Trx_Speed but rather in smooth incremental changes as the traction speed reduces. For instance, while a vehicle is traveling relatively fast, there may be a greater likelihood that a sharp steering change can cause control or stability issues as compared to when the vehicle is traveling relatively slowly. Accordingly, a current measured value of the traction speed or Trx_Speed of the vehicle can be used to determine a maximum allowable angle to which the steered wheel can be changed so as to stay within a desired Wheel Angle-to-Traction Speed relationship maintaining operator stability, such as shown in FIG. 7B. This traction speed dependent maximum allowable angle can be referred to as the Wheel_Angle_Limit.

Also, the Wheel_Angle_Target can be used by the traction application 208 to determine a maximum allowable traction speed at which the vehicle can be traveling at a wheel angle equal to the Wheel_Angle_Target so as to maintain a desired Wheel Angle-to-Traction Speed relationship, such as shown in FIG. 7A. This maximum allowable traction speed can be referred to as the second Trx_Speed_Limit$_2$, or the traction speed to which the vehicle shall be reduced while also adjusting the steered wheel angle to the Wheel_Angle_Cmd. Because of the quick response of the traction system to reduce the speed of the vehicle, the steering system is able to achieve the operator desired steering adjustment without perceivable delay as mentioned above.

Figure 4A:
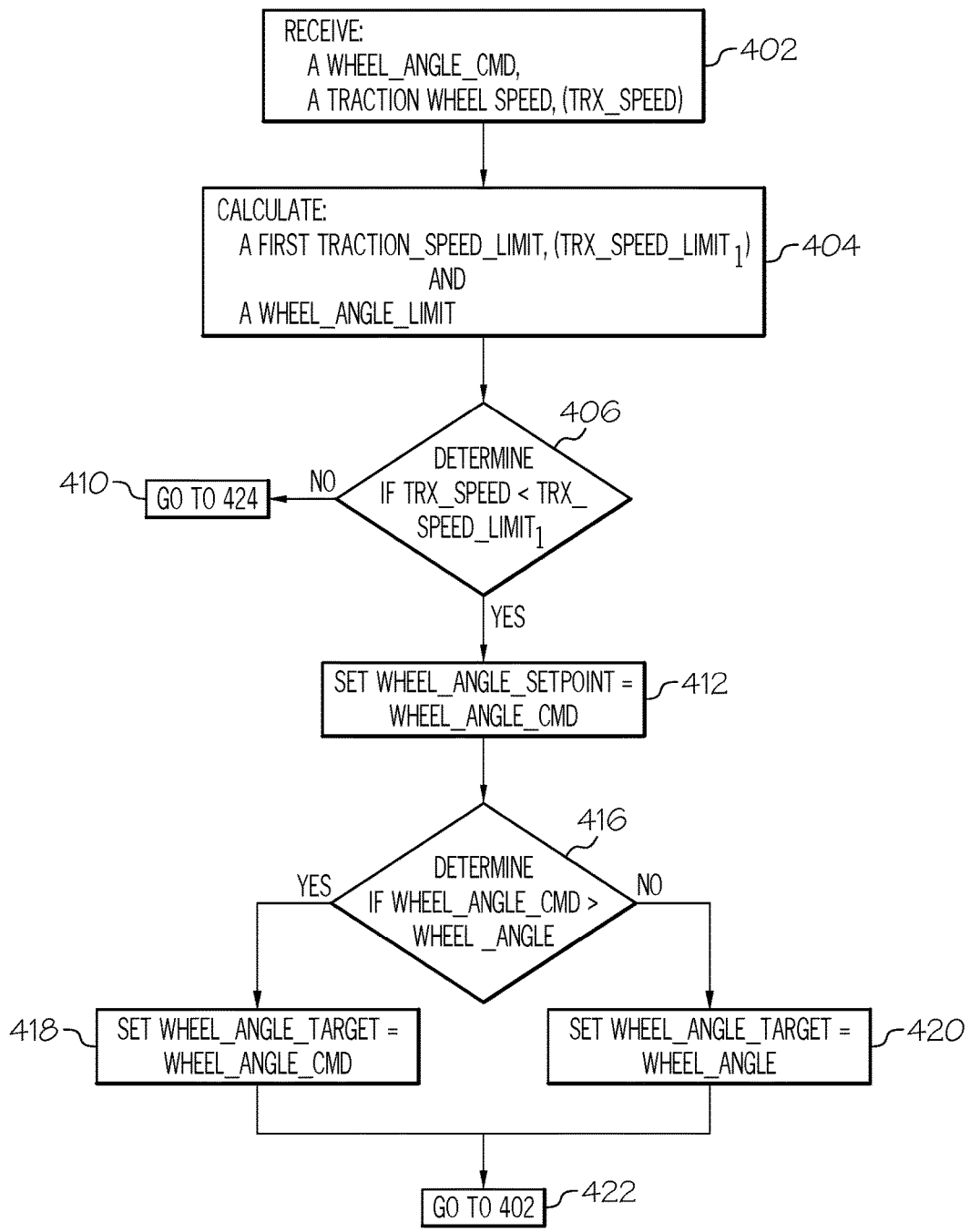
FIG. 4A-FIG. 4D illustrate a flowchart of an example control algorithm of a steering application and traction application in accordance with the principles of the present invention.
Figure 4B:
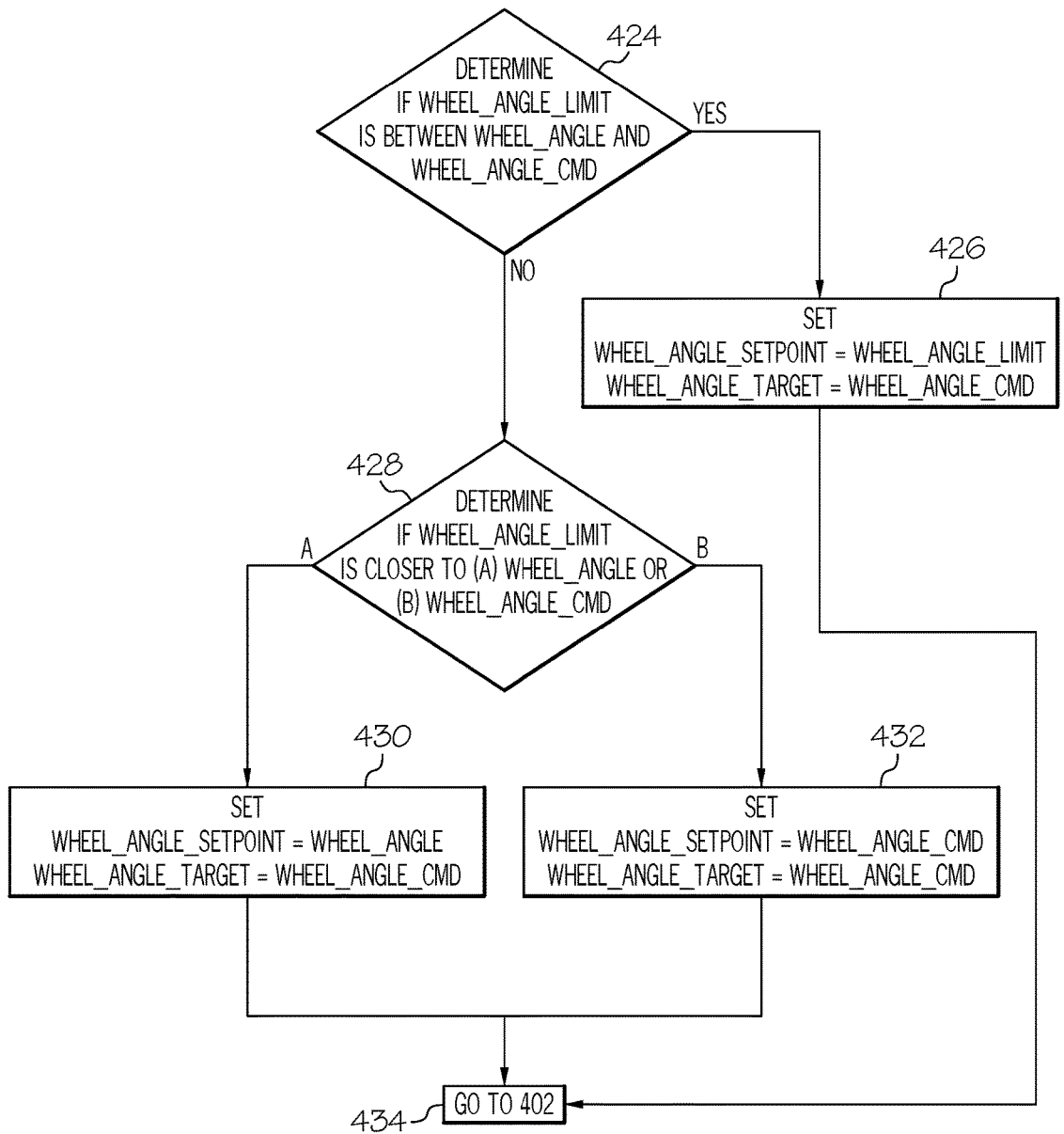
Figure 4C:
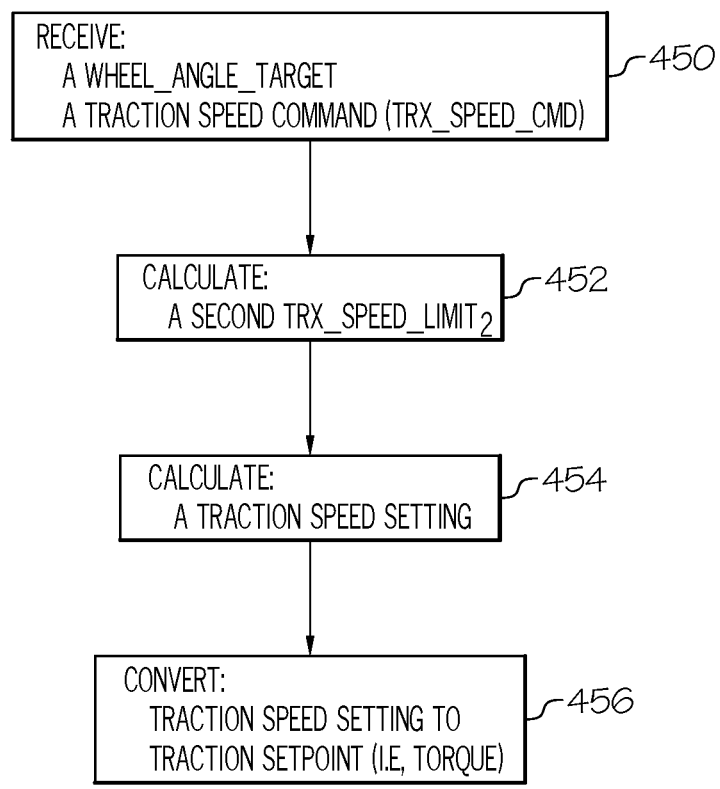

An example control algorithm, or process, for the steering application 206 of the VCM 200, is illustrated in FIG. 4A and FIG. 4B. The traction application 208 communicates with and works in conjunction with the steering application 206 to ensure that a Trx_Speed and a Wheel_Angle remain at a value that allows for safe control and stability defined by desired Wheel Angle-to-Traction Speed relationships, see FIGS. 7A and 7B. FIG. 4C illustrates an example algorithm of a portion of the traction application that generates a traction setpoint $\tau_1$ and/or a traction speed setting $\omega_4$.

In FIG. 4A, in step 402, a Wheel_Angle_Cmd and the traction motor speed feedback $\omega_3$, defining a measured traction wheel or motor speed (i.e., Trx_Speed), are received so that, in step 404, a first Trx_Speed_Limit$_1$ and Wheel_Angle_Limit can be calculated. A lookup table 700 constructed from a graph 706 in FIG. 7A in the illustrated embodiment can be used to determine a Trx_Speed_Limit$_1$ based on the Wheel_Angle_Cmd. In particular, the x-axis of the table 700 can refer to an absolute value of a wheel angle amount 704 that can be between 0 and 90 degrees, wherein 0 degrees corresponds to a wheel angle when the vehicle is traveling in a straight line. The y-axis of the table 700 corresponds to a velocity value 702 of the traction wheel or traction motor, i.e., the first Trx_Speed_Limit$_1$. The graph 706 in FIG. 7A depicts a Wheel Angle-to-Traction Speed relationship between a wheel angle value on the x-axis 704 and a maximum traction speed value or limit on the y-axis. The steering application 206 uses the Wheel_Angle_Cmd as the x-axis value 707 and locates the corresponding y-axis value 708 on the graph 706. The y-axis value 708 is determined to be the first Trx_Speed_Limit$_1$ for the steering application.

Referring to FIG. 7B, a lookup table 710 constructed from the graph in FIG. 7B in the illustrated embodiment can be used to determine a Wheel_Angle_Limit based on the Trx_Speed. In particular, the x-axis of the table 710 can refer to a measured velocity value 714 of the traction wheel or traction wheel motor, i.e., the Trx_Speed. The y-axis of the table 710 can refer to an absolute value of a wheel angle amount 712 that can be between 0 and 90 degrees, wherein 0 degrees corresponds to a wheel angle when the vehicle is traveling in a straight line. The graph 716 in FIG. 7B depicts a Wheel Angle-to-Traction Speed relationship between a maximum wheel angle value on the y-axis 712 and a traction speed value on the x-axis 714. The steering application 206 uses the Trx_Speed as the x-axis value 717 and locates the corresponding y-axis value 718 on the graph 716. The y-axis value 718 is determined to be the Wheel_Angle_Limit.

The steering application 206 can also receive the measured steered wheel angle $\theta_2$ of the steered wheel 20 or the measured angular velocity $\omega_2$ of the steering motor 274, i.e., a measured Wheel_Angle, that has a value indicative of the present angle of the vehicle's steered wheel or angular velocity of the steering motor. In step 406, a determination is made as to whether the vehicle's current traction speed, Trx_Speed, is less than the first Trx_Speed_Limit$_1$. If it is not, then the traction speed of the vehicle is reduced by the traction application 208 while the steering application 206 adjusts the Wheel_Angle to equal the Wheel_Angle_Cmd. As shown by block 410 of FIG. 4A, the control logic of the steering application 206 can continue at step 424 of FIG. 4B where a determination is made as to whether the Wheel_Angle_Limit is between the Wheel_Angle and the Wheel_Angle_Cmd. As long as the Wheel_Angle_Limit is between the current Wheel_Angle and the Wheel_Angle_Cmd, the Wheel_Angle_Setpoint is set to the Wheel_ Angle_Limit in step 426. Otherwise a determination is made in step 428 whether the Wheel_Angle_Limit is closer to the Wheel_Angle or the Wheel_Angle_Cmd. The Wheel_ Angle_Setpoint is set equal to the value closer to the Wheel_Angle_Limit: the Wheel_Angle or the Wheel_Angle_Cmd in steps 430 or 432, respectively. In any case (i.e., step 426, 430, or 432), the Wheel_Angle_Target is set equal to the Wheel_Angle_Cmd. In the illustrated embodiment, when the Trx_Speed is equal to or greater than the first Trx_Speed_ Limit$_1$, the traction application 208 can quickly reduce the traction wheel or motor speed, i.e., the Trx_Speed, to the second Trx_Speed_Limit$_2$, in the manner discussed below with regards to FIG. 7C, wherein the second Trx_Speed_ Limit$_2$ is based on the Wheel_Angle_Target, and, as noted above, in steps 426, 430 and 432, the Wheel_Angle_Target is set equal to the Wheel_Angle_Cmd. In step 434 control returns to step 402 so that another iteration of these steps just described can be performed.

FIG. 4C illustrates an example algorithm of how the traction application 208 can produce a traction setpoint such that, in appropriate circumstances, the vehicle's traction speed, Trx_Speed is reduced. Referring to FIG. 7A, the lookup table 700 can be used to determine a second Trx_ Speed_Limit$_2$ based on the Wheel_Angle_Target in the same manner that the steering application 206 determines a Trx_Speed_Limit$_1$ based on the Wheel_Angle_Cmd. In this manner, the traction application 208 can be made aware of a future Wheel_Angle, i.e., the Wheel_Angle_Target, and adjust the traction speed accordingly even before the current Wheel_Angle has reached that commanded angle, i.e., the Wheel_Angle_Target.

Returning to step 406, if the vehicle's traction speed, however, is below the first Trx_Speed_Limit$_1$, then the traction wheel or motor speed or the Trx_Speed requires no reduction to meet the Wheel Angle-to-Traction Speed relation, such as illustrated in FIG. 7A at a Wheel_Angle equal to Wheel_Angle_Cmd. Therefore the Wheel_Angle_Setpoint can be set to Wheel_Ang_Cmd in step 412 of FIG. 4A. Again to maintain operator stability, the Wheel_Angle_Target is set equal to the larger of the Wheel_Angle_Cmd or the Wheel_Angle in steps 418 or 420, respectively, based on a comparison between the Wheel_Angle_Cmd and the Wheel_ ngle performed in step 416. In either case, in step 422, control returns to step 402 so that another iteration of these steps just described can be performed.

According to an example algorithm depicted in FIG. 4C, the traction application 208 can calculate a traction speed setpoint $\omega_4$ or a traction setpoint $\tau_1$, such that, in appropriate circumstances, the traction wheel or motor speed, i.e., the Trx_Speed, of the vehicle 10 is reduced. The traction application receives, in step 450, a traction speed control input signal 260 received from an operator controlled traction speed control input sensor 262 so as to determine a traction speed command. The traction speed control input signal 260 may be adjusted or otherwise conditioned and may, for example, be provided to an input pin of the master microcontroller 216A within the VCM 200. That signal may be further conditioned and used by the traction application 208 that is being executed by the master microcontroller 216A to calculate the traction speed command, Trx_Speed_Cmd. As described above, the traction application 208 also receives the target steering angle $\theta_T$ or the Wheel_Angle_Target from the steering application 206. In step 452, a look-up table or similar model can be accessed to calculate a maximum traction speed (i.e., the second Trx_Speed_Limit$_2$) corresponding to a vehicle 10 being steered at the Wheel_Angle_Target.

Referring back to FIG. 7A, the same lookup table 700 used by the steering application 206 to determine a first Trx_Speed_Limit$_1$ based on the Wheel_Angle_Cmd can be used by the traction application 208 to determine a second Trx_Speed_Limit$_2$ based on the Wheel_Angle_Target. In particular, the x-axis of the table 700 can refer to an absolute value of a wheel angle amount 704 that can be between 0 and 90 degrees, wherein 0 degrees corresponds to a wheel angle when the vehicle is traveling in a straight line. The y-axis of the table 700 corresponds to a velocity value 702 of the traction wheel or traction wheel motor. The graph 706 depicts a predetermined Wheel Angle-to-Traction Speed relation between a wheel angle value on the x-axis 704 and a maximum traction speed value on the y-axis. The traction application 208 uses the Wheel_Angle_Target as the x-axis value 707 and locates the corresponding y-axis value 708 on the graph 706. The y-axis value 708 is determined to be the second Trx_Speed_Limit for the traction application 208.

The Trx_Speed_Cmd reflects a vehicle speed that the operator desires to reach. In step 454, the traction application 208 may use the second Trx_Speed_Limit$_2$ to reduce the Trx_Speed_Cmd in order to calculate an allowable Trx_Speed_Setting, $\omega_4$.

Figure 7C:
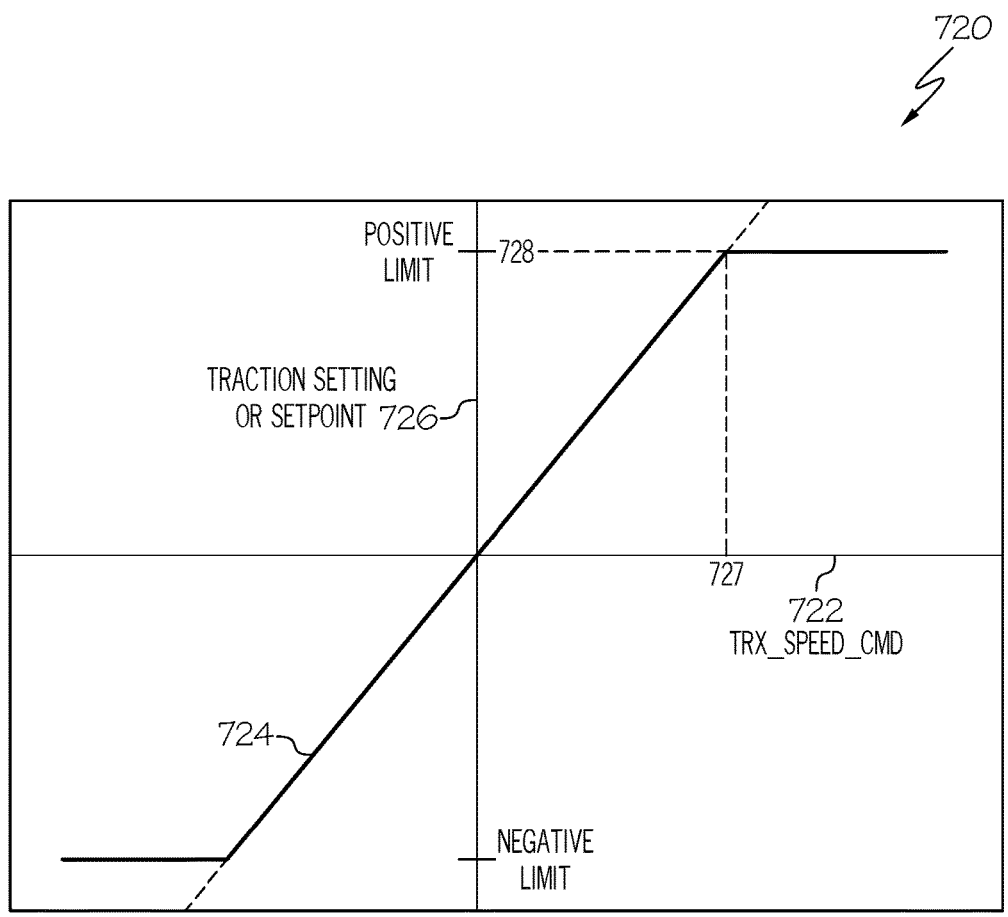

For example, a lookup table 720 constructed from a graph 724 in FIG. 7C in the illustrated embodiment can be used to limit a Trx_Speed_Cmd. Both the x-axis 722 and the y-axis 726 represent a speed value of either the traction wheel or the traction motor and the graph 724 defines a relationship between values on the x-axis and corresponding values on the y-axis. These speed values can be either positive or negative so a positive limit and a negative limit are shown in FIG. 7C; however, an example is described below that is based on only a positive traction speed value. The traction application uses the Trx_Speed_Cmd as the speed value, e.g., a value 727, for the x-axis 722 and locates the corresponding speed value, e.g., a value 728 corresponding to the value 727, on the y axis of the graph 724. This corresponding value 728 is output by the traction application 208 as the Trx_Speed_Setting, $\omega_4$. Presuming the graph 724 is a 45 degree line between 0 and the value 728, which equals the value of the current second Trx_Speed_Limit$_2$, then the speed value along the y-axis will equal the speed value along the x-axis in this range. However, once the speed value along the x-axis exceeds the speed value 727, which value 727 equals the speed value 728 and the current second Trx_

Speed_Limit$_2$, the graph 724 has a y-value limited to the value 728, which again equals the current value of the second Trx_Speed_Limit$_2$. Accordingly, if the traction application 208 sets the speed value 728, i.e., the maximum value of the graph 724 in the y direction, to equal the current second Trx_Speed_Limit$_2$, then the Trx_Speed_Cmd received by the traction application will not result in a Trx_Speed_Setting, $\omega_4$ that exceeds the second Trx_Speed_Limit$_2$.

When the Trx_Speed is equal to or greater than the first Trx_Speed_Limit$_1$ in step 406 in FIG. 4A, the Wheel_Angle_Target is set equal to the Wheel_Angle_Cmd. The traction application 208 uses the Wheel_Angle_Target equal to the Wheel_Angle_Cmd to determine a second Trx_Speed_Limit$_2$, which, because the first Trx_Speed_Limit$_1$ is also determined from the Wheel_Angle_Cmd, the first Trx_Speed_Limit$_1$ equals the second Trx_Speed_Limit$_2$ in this scenario. The traction application 208 then uses the Trx_Speed_Cmd as an input into the lookup table 720 based on the graph 724 in FIG. 7C and receives an output. Presuming the Trx_Speed is generally equal to the Trx_Speed_Cmd and since the Trx_Speed is greater than the first Trx_Speed_Limit$_1$, the output from the lookup table 720 typically equals the second Trx_Speed_Limit$_2$. Hence, the traction application 208 outputs as the Trx_Speed_Setting, $\omega_4$ the second Trx_Speed_Limit$_2$. The TCM 258 then quickly reduces the traction wheel or motor speed, i.e., the Trx_Speed, to the second Trx_Speed_Limit$_2$.

The traction setpoint may be a traction speed setpoint $\omega_4$ defined by the Trx_Speed_Setting $\omega_4$, or the traction setpoint may be a traction setpoint $\tau_1$ that can be calculated based on the Trx_Speed_Setting and a current Trx_Speed of the vehicle. As one example and as known to those skilled in the prior art, a proportional-integral-derivative (PID) controller can be used that receives, as an input, a difference value between the Trx_Speed_Setting and the Trx_Speed and calculates, as output, the traction setpoint $\tau_1$. Thus, in step 456, the traction application 208 calculates the traction setpoint $\tau_1$ which the TCM 258 will use to control operation of the traction motor 264. The traction setpoint $\tau_1$ is calculated so as to control the traction motor speed, e.g., to reduce the Trx_Speed of the vehicle when the Trx_Speed is equal to or greater than the first Trx_Speed_Limit$_1$ in step 406 in FIG. 4A, to arrive at the Trx_Speed_Limit$_2$ while the Wheel_Angle is also being adjusted to arrive at the Wheel_Angle_Cmd.

Figure 4D:
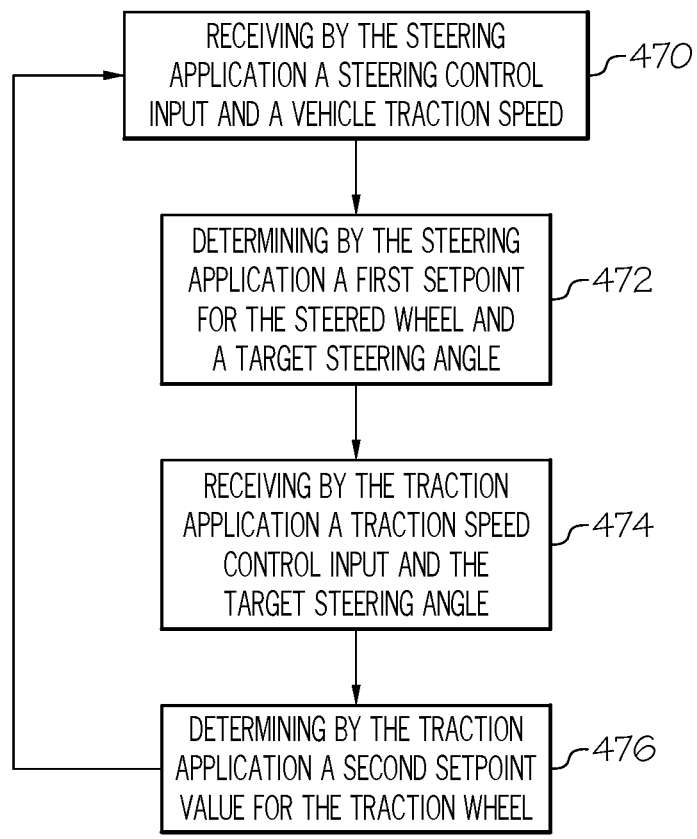

FIGS. 4A and 4B relate to operation of the steering application 206 and FIG. 4C relates to operation of the traction application 208. FIG. 4D is a flowchart of a conceptual view of how both the steering application 206 and the traction application 208 operate together. In step 470, the steering application receives the steering control input and a present value of the vehicle's traction speed $\omega_3$, Trx_Speed. As mentioned above, the steering application can then determine in step 472 a first setpoint for the steered wheel (i.e., steering setpoint $\omega_1$ or $\theta_1$). As described above, this first setpoint value can be affected by the present traction speed of the vehicle, $\omega_3$, because the steering application uses the table of FIG. 7B to determine a maximum allowable steering setpoint $\omega_1$ or $\theta_1$. The steering control module 272 can then control the steering motor 274 based on this first setpoint to effect a change in an actual angle of the steered wheel.

In step 472, the steering application also determines a value of the target steering angle $\theta_T$. Independent of the logical flow of the steering application, the traction application executes in order to determine a second, traction setpoint (i.e., $\tau_1$ or $\omega_4$). In particular, in step 474, the traction application receives the target steering angle $\theta_T$ and a traction speed control input. In step 476, the traction application uses the Wheel_Angle_Target or target steering angle $\theta_T$ and the graph of FIG. 7A to determine the second Trx_Speed_Limit$_2$ which, as described above, can be used to limit a value of the traction setpoint (i.e., $\tau_1$ or $\omega_4$) generated by the traction application. The traction control module 274 can then control the traction motor 264 based on this second setpoint to effect a change in an actual speed of the traction wheel.

The logical flow of the flowchart of FIG. 4D returns from step 476 to step 470 in order to repeatedly iterate through the steps, such that in each successive iteration through the four steps 470-476, updated values for the vehicle traction speed $\omega_3$ and, thus, the target steering angle $\theta_T$ are utilized. In this manner, when the Trx_Speed is equal to or greater than the first Trx_Speed_Limit$_1$ in step 406 in FIG. 4A, the steering application and the traction application cooperate to reduce the Trx_Speed, $\omega_3$, of the vehicle to arrive at the Trx_Speed_Limit$_2$ while the Wheel_Angle, $\omega_2$ or $\theta_2$, is also being adjusted to eventually arrive at the Wheel_Angle_Cmd.

Figure 8A:
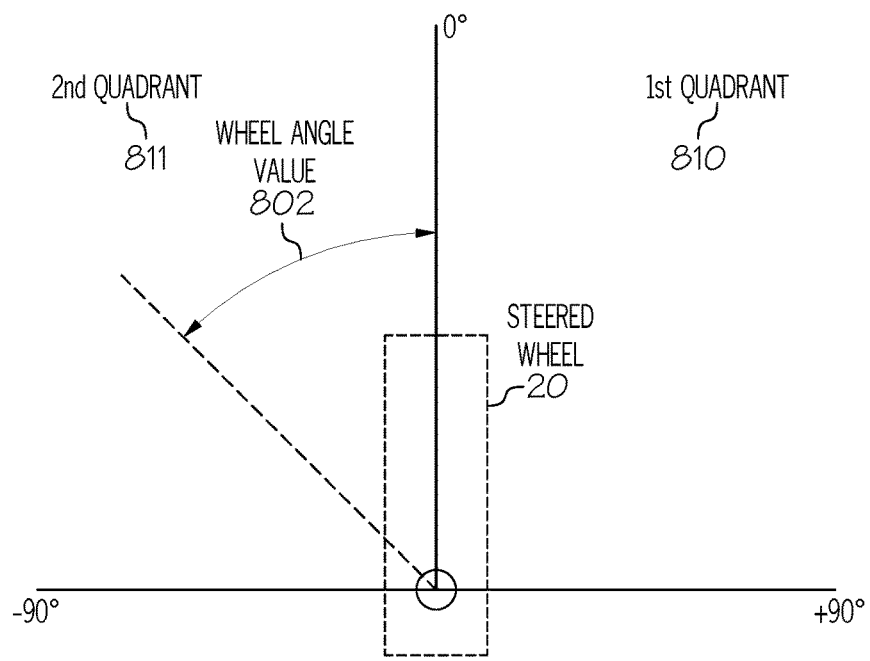
FIGS. 8A and 8B illustrate a frame of reference for measuring or calculating a value related to a steered wheel angle in accordance with the principles of the present invention.

The steered wheel 20 of at least some vehicles can be turned in a complete circle (i.e., 360 degrees) from a position pointing straight ahead (i.e., 0 degrees) to a position pointing straight behind (i.e., 180 degrees). Also, the steered wheel 20 can also be turned to the right and turned to the left. Therefore, the steered wheel 20 can be located in any one of first, second, third and fourth quadrants 810, 811, 812, and 813 shown in FIGS. 8A and 8B and travel between adjacent quadrants in the course of a turn. Similarly, the Wheel_Angle_Cmd and the Wheel_Angle_Limit can, for example, refer to values in any of the four quadrants 810, 811, 812, and 813. In FIG. 8A, a value 802 related to a wheel angle amount can be measured so as to be between 0 and +/−90 degrees. When measured this way for quadrants 810 and 811, a larger absolute value of the value 802, represents a "sharper" turn. Similarly, in FIG. 8B, the value 802 related to a wheel angle amount can be measured so as to vary between 0 and +/−90 degrees. As before, when measured this way for quadrants 812 and 813, a larger absolute value of the value 802 represents a "sharper" turn.

Figure 8B:
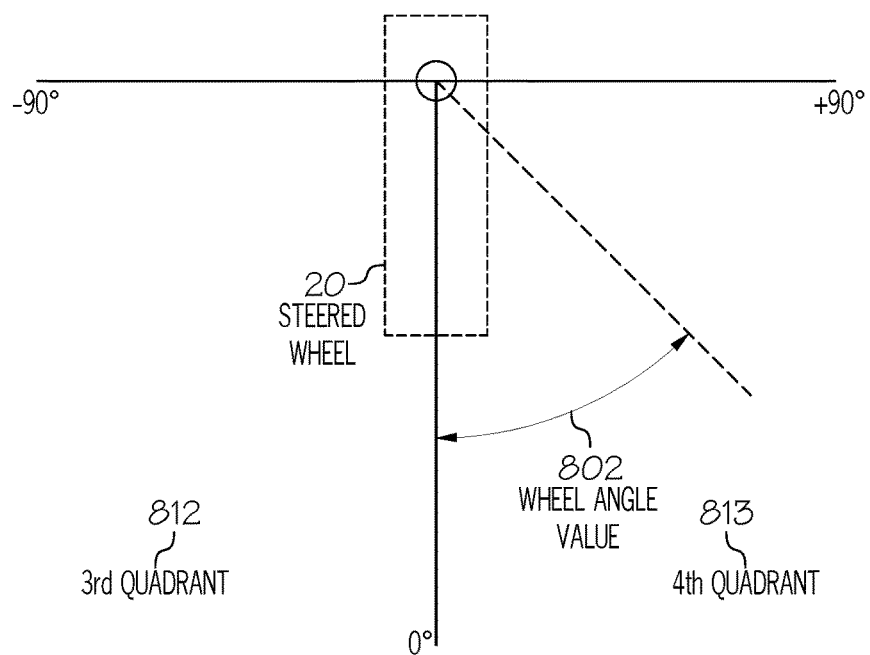

Regardless of which quadrant 810, 811, 812, 813 the Wheel_Angle_Cmd value is actually in, it can be measured as shown in FIGS. 8A and 8B and its absolute value can then be used, by the steering application 206, as the value 707 in the lookup table 700 of FIG. 7A to identify a maximum traction speed value 708 on the y-axis, i.e., a first Trx_Speed_Limit$_1$. Similarly, regardless of which quadrant 810, 811, 812, 813 the Wheel_Angle_Target value is actually in, it can be measured as shown in FIGS. 8A and 8B and its absolute value can then be used, by the traction application 208, as the value 707 in the lookup table 700 to identify a maximum traction speed value 708 on the y-axis, i.e., a second Trx_Speed_Limit$_2$.

With respect to the table 710 of FIG. 7B, the Trx_Speed value 717 can be used to identify a Wheel_Angle_Limit 718 that has a value that varies between some minimum value 719 and 90 degrees. As discussed above, this Wheel_Angle_Limit can be used by the steering application 206 to limit a steering setpoint value in any of the four quadrants 810, 811, 812, 813 of FIGS. 8A and 8B.

Additionally, the flowcharts of FIGS. 4A-4C discussed above involve a number of quantities related to a steered wheel angle: Wheel_Angle_Target, Wheel_Angle_Cmd, Wheel_Angle_Limit, Wheel_Angle_Setpoint, and Wheel_Angle. When these quantities are measured (or calculated)

using the frame of reference shown in FIGS. 8A and 8B, then the absolute value of that quantity can be used in the comparative steps of FIGS. 4A-4C to provide the appropriate logical flow control. The measured value of the steered wheel is in the range of −180 to +180 degrees. In order to use the look-up-tables, both the steering and traction applications convert the wheel angle to a value between −90 and +90 degrees. For measured wheel angles between −90 and +90 degrees, both applications take the absolute value of the measured wheel angle. For measured wheel angles between 90 and 180 degrees or −90 and −180 degrees, both applications take the absolute value of the measured wheel angle and convert and subtract it from 180 degrees. In this manner, angles between 90 and 180 degrees are converted to angles between 90 and 0 degrees.

Correlation Example of a Diagnostic Comparison:

Because of the way microcontrollers and other digital hardware of the vehicle handle signals and values of signals, the feedback value $\omega_3$, for example, can be an array of values that results from a continuous signal being sampled at a periodic rate (e.g., every 10 ms). Similarly, the second model 256 can be provided with the respective setpoint or traction speed setting $\omega_4$ every 10 ms (for example) so that a new virtual value $\omega_6$ is calculated every 10 ms. While it would be possible to compare each individual feedback value $\omega_3$ with a single, corresponding virtual value $\omega_6$, that comparison may not accurately reveal whether or not the traction system of the vehicle is malfunctioning. However, comparing the last predefined number, e.g., 100, feedback values $\omega_3$ with the predefined number, e.g., 100, of most recently generated virtual values $\omega_6$ would likely provide a much more accurate indication of whether or not the vehicle's traction system is malfunctioning. Thus, the virtual value $\omega_6$ can comprise a first array of individually valued elements and the measured value $\omega_3$ can comprise a second array of corresponding individually valued elements so that the similarity between the measured value $\omega_3$ and the virtual value $\omega_6$ is determined based on a computed correlation between the first array and the second array.

In general, the more samples of feedback values $\omega_3$ and the more calculations of the virtual values $\omega_6$ that are used for a comparison to one another, the more accurate of a result will be produced. However, accumulating more samples of these values reflect a longer time period which might allow a malfunction to occur for an extended period of time before that condition is detected. Accordingly, there is typically some operational upper limit to the amount of time used to collect values before a comparison is made between the feedback value $\omega_3$ and the virtual value $\omega_6$. For example, there may be operational constraints that require detection and/or mitigating action be initiated within, for example, 100 ms of a malfunction occurring. Or for instance, there may be a maximum allowable deviation between the setpoint $\omega_4$ and the actual speed $\omega_3$ to keep the system under proper control which would potentially decrease or increase the diagnostic evaluation time.

If the sample period of the feedback value $\omega_3$ is 10 ms, then 10 samples can be collected and used for the comparison between the feedback value $\omega_3$ and the virtual value $\omega_6$ using a 10 ms response time. The 10 samples of the feedback value $\omega_3$ can be considered a first random variable, X, comprising an array of 10 actual responses (e.g., $x_1$-$x_{10}$) to 10 input values (i.e., setpoint values $\omega_4$) and the virtual value $\omega_6$ can be considered a second random variable, Y, comprising 10 simulated model responses (e.g., $y_1$-$y_{10}$) to those same 10 input values. One measure of similarity of two random variables is known as a correlation coefficient, P.

The correlation coefficient of two variables, sometimes simply called their correlation, is the covariance of the two variables divided by the product of their individual standard deviations. It is a normalized measurement of how the two variables are linearly related. However, one of ordinary skill will recognize that there are many other techniques for measuring similarity between two arrays of values.

Using well understood techniques, the respective average, $\overline{X}$, $\overline{Y}$, of the variables X, Y can be computed and then each respective variance $\sigma_x^2$, $\sigma_y^2$ can be computed as well. The square root of the variances provide a respective standard deviation $\sigma_x$, $\sigma_y$ for each variable. The covariance $C_{xy}$ of the two variable can be also be calculated according to:

$$C_{xy} = \frac{1}{10}\left(\sum_{i=1}^{10}((x_i - \overline{X})(y_i - \overline{Y}))\right)$$

which allows the correlation coefficient to be calculated according to:

$$P = \frac{C_{xy}}{\sigma_x \sigma_y}.$$

When two variables or signals exactly correlate P=1 and for exactly uncorrelated signals, P=0. Thus, a predetermined threshold value can be identified which is used to determine that when the P value is below that threshold, the feedback value $\omega_3$ and the virtual value $\omega_6$ are not similar to one another. In the example where 10 samples are used to calculate P, then a value for P of around 0.5 to around 0.8 likely indicates that the feedback value $\omega_3$ and the virtual value $\omega_6$ are similar enough that a traction system malfunction is unlikely. If a P value is calculated below 0.5, then a malfunction of the traction system of the vehicle is likely occurring. Because of unexpected noise or other anomalies, the occurrence of a single P value below that threshold may occasionally occur even in the absence of a malfunction. Thus, the second diagnostic supervisor 252 may increment a counter each time a P value is calculated below the predetermined threshold and decrement the counter each time a P value is calculated above the predetermined threshold. If the value of that counter ever reaches a maximum allowable number (e.g., 5), then the second diagnostic supervisor 252 can alert the VCM 200 that a fault condition has occurred.

Independent of the second diagnostic supervisor 252, the first diagnostic supervisor 250 can also calculate how similar the virtual value $\omega_5$ from the first model 254 is to the feedback value $\omega_3$. While the first diagnostic supervisor 250 could employ a model 254 different than the second model 256, a different sampling period, or a different similarity measurement technique, the first diagnostic supervisor 250 may also be configured substantially similar to the second diagnostic supervisor 252 so that it operates in almost an identical way. Thus, the first model 254 and the second model 256 may both be the same model and a similar correlation coefficient and counter can be used by the first diagnostic supervisor 250 to generate its own diagnostic signal alerting the VCM 200 of a fault condition of the vehicle's traction system. In order to utilize the above correlation technique, the diagnostic traction model can generate the required simulated response sequence. There are various ways to model or simulate systems similar to the isolated traction system of the vehicle described above. Any of these known modeling techniques may be used without departing from the scope of the present invention. However, one example type of model that can be used for either the model 254 or 256 is a transfer function model calculated based on observed responses of an actual isolated traction system to a plurality of different operating conditions.

Generally, a transfer function (and analogous terms "system function" and "network function") refers to a mathematical representation to describe a relationship between the inputs and outputs of a system. In particular, the relationship is described using a ratio of polynomials where the roots of the denominator polynomial are referred to as the system poles and the roots of the numerator polynomial are referred to as the system zeros.

Figure 5:
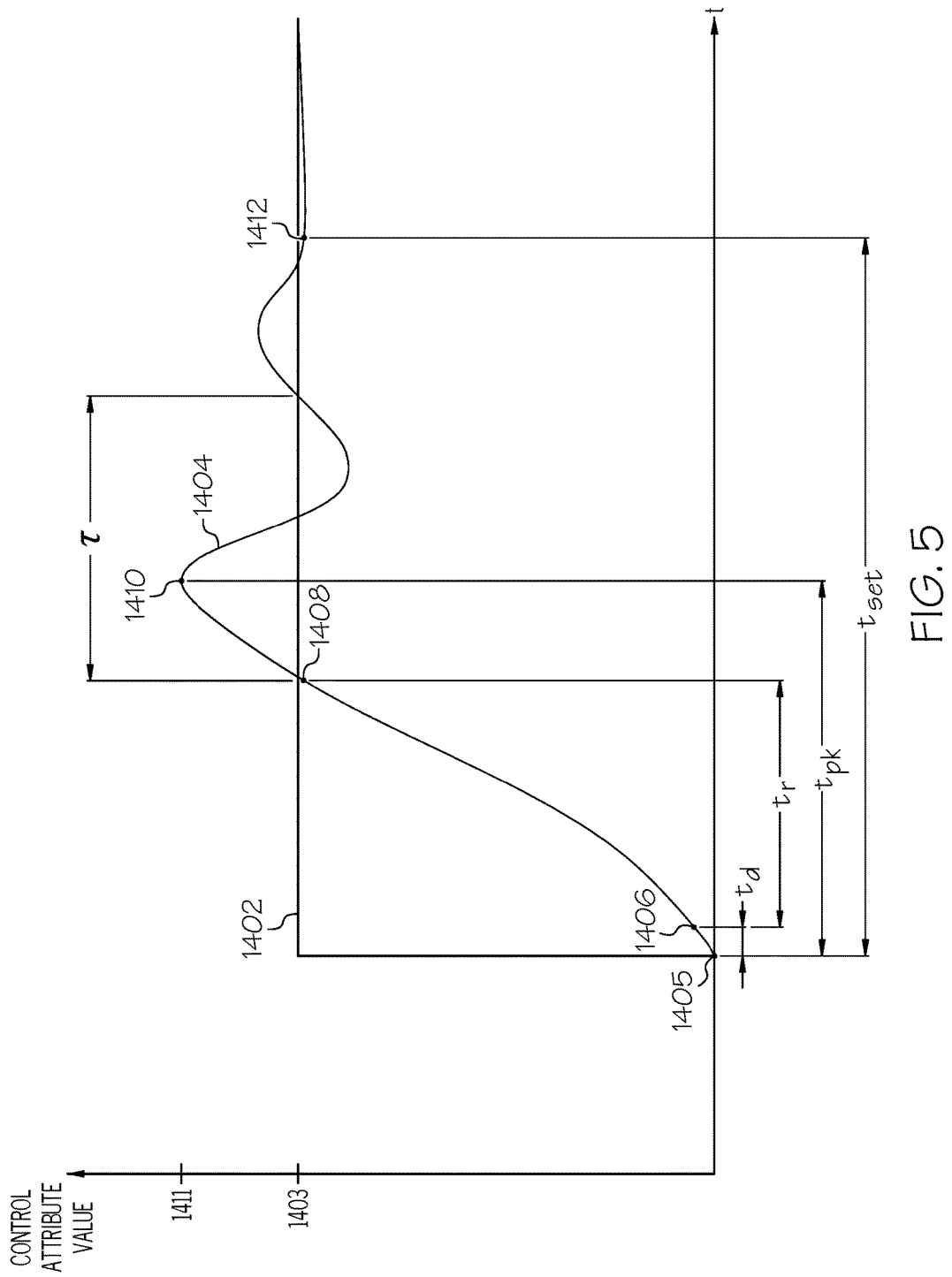
FIG. 5 graphically depicts an example of how a vehicle traction system can react to a step input.

A transfer function for a system can be developed by providing the system with well-defined input values and collecting the resulting output values. For example, an isolated vehicle traction system as described above that includes a controller, a traction motor, and a load on the motor can be provided with input values and then observed in order to measure the resulting output. FIG. 5 graphically depicts an example of how a vehicle traction system can react to a step input.

In FIG. 5, the y-axis represents both an input value for a control attribute related to the vehicle traction wheel and an output value of that control attribute which results. The x-axis represents time. The step input 1402 can, for example, reflect the vehicle traction system receiving an operator input, at time 1405, that corresponds to a desired traction wheel or traction motor speed 1403. The output signal 1404 reflects an actual response of the isolated traction system components to the input 1402.

The output signal 1404 can include a number of characteristic attributes. The point 1406 corresponds to when the output signal 1404 first shows a response to the step input 1402; the point 1408 corresponds to when the output signal 1404 reaches the value 1403; the point 1410 corresponds to the peak value 1411 of the output signal 1404; and the point 1412 corresponds to when the output signal 1404 settles (i.e., reaches steady state) at the desired traction wheel or traction motor speed value 1403. These different points help define a delay time $t_d$ between points 405 and 406, a peak time $t_{pk}$ between points 1405 and 1410, a settling time $t_{set}$ between points 1405 and 1412, and a rise time $t_r$ between points 1406 and 1408. The output signal 1404 also includes an overshoot value related to the steady state value 1403 and the peak value 1411. The output signal's overshoot is typically referred to as "percentage overshoot" and calculated according to:

$$\% \text{ overshoot} = \frac{\text{peak value} - \text{steady state value}}{\text{steady state value}}.$$

The oscillating portion of the output signal 1404 before it settles to its steady state value includes an oscillating period $\tau$ that defines a natural frequency $f_n$ (i.e., $1/\tau$) which, in terms of radians, is $\omega_n = 2\pi f_n$. Also, a damping coefficient $\zeta$ can be calculated according to:

$$\zeta = \frac{4}{t_{set}\omega_n}$$

The input signal 1402 can be considered a time-based continuous signal x(t) and the output signal 1404 can also be considered a time-based signal u(t) such that the Laplace transform of each signal is X(s) and U(s). The transfer function, H(s) for the isolated traction system is therefore generically defined as U(s)=H(s)X(s). More specifically, a system that produces the output signal 1404 of FIG. 5 based on receiving the step input signal 1402 can be represented by a second order transfer function H(s) according to:

$$H(s) = \frac{\omega_n^2}{s^2 + 2\zeta\omega_n s + \omega_n^2}$$

As described above, however, the microcontrollers and diagnostic supervisors operate with discrete time-sampled values and not with continuous signals. Thus, the transfer function H(s) can be transformed into a discrete transfer function H(z) by a variety of different methods. One method, known as a bilinear transfer transforms H(s) to H(z) by making the substitution of:

$$s = \left(\frac{z-1}{z+1}\right)\left(\frac{z}{t_s}\right)$$

where
$t_s$ is the sampling time (e.g., 10 ms) used to measure values of the input and output signals.

There are, however, automated methods for calculating a discrete transfer function that are available as alternatives to the methods just described. For example, MATLAB includes a function "c2d" that automates this process. If, for example, the input signal 1402 and the output signal 1404 reveal an initial transfer function of:

$$H(s) = \frac{10}{s^2 + 3s + 10}$$

then the commands:
h=tf(10, [1 3 10]);
hd=c2d(h, 0.01)
will first define the continuous transfer function "h" and transform it to a discrete transform function "hd" using a sampling time of "0.01" seconds. The MATLAB command "hd=" will print out the discrete transform function as:

$$H(z) = \frac{0.01187z^2 + 0.06408z + 0.009721}{z^2 - 1.655Z + 0.7408}$$

This transfer function H(z) can be used by the first and second diagnostic supervisors 250, 252 to produce virtual values for the control attribute related to the traction wheel or traction motor of the vehicle. In particular, when a setpoint value is received by a diagnostic supervisor (250, 252) it is transformed by the transfer function H(z) to a virtual value. Thus, a stream of discrete samples of the setpoint value (e.g., traction speed setting or setpoint $\omega_4$) produces a corresponding stream of virtual values (e.g., $\omega_6$). These virtual values can then be compared with the feedback values $\omega_3$ to determine an operating condition of the traction system of the vehicle.

In particular, if "k" is used as an index to refer to a particular sample x[k] in the stream of discrete samples of the setpoint value $\omega_4$, then a corresponding virtual value y[k] (i.e., $\omega_6$) can be calculated according to the above transfer function using:

$$y[k] = \frac{(ax[k] + bx[k-1] + cx[k-2] - ey[k-1] - fy[k-2])}{d}$$

where, for this particular example transfer function:
a=0.01187,
b=0.06408,
c=0.009721,
d=1,
e=−1.655, and
f=0.7408.

MATLAB also provides tools to fine-tune this initial transfer function H(z). For example, the transfer function H(z) can be modeled in SIMULINK which includes an OPTIMIZATION TOOLBOX. The OPTIMIZATION TOOLBOX includes a tool for model parameter estimation. In the example transfer function H(z) above, the numerator coefficients are [0.01187 0.06408 0.009721] and the denominator coefficients are [1 −1.655 0.7408]. The parameter estimation function of the OPTIMZATION TOOLBOX can be provided with a set of input data, a set of output data and the transfer function. For example, the parameter estimation tool can be provided with data representing the input signal 1402, the output signal 1404 and the transfer function H(z). The parameter estimation function will use the input data and the transfer function H(z) to calculate a simulated set of output data. Based on a comparison between the actual output signal 1404 and the simulated output data, the parameter estimation function will fine-tune the numerator and denominator coefficients to more closely match the simulated data to the actual output data signal 1404.

To further refine the transfer function H(z), other actual input and output data can be provided to the parameter estimation function of the SIMULINK OPTIMIZATION TOOLBOX. For example, a sinusoidal input and its resulting output can be provided and a ramp input and its resulting output can be provided. As a result, a transfer function H(z) can be developed that is calculated based on observed responses of a vehicle traction system to a plurality of different operating conditions.

Figure 6:
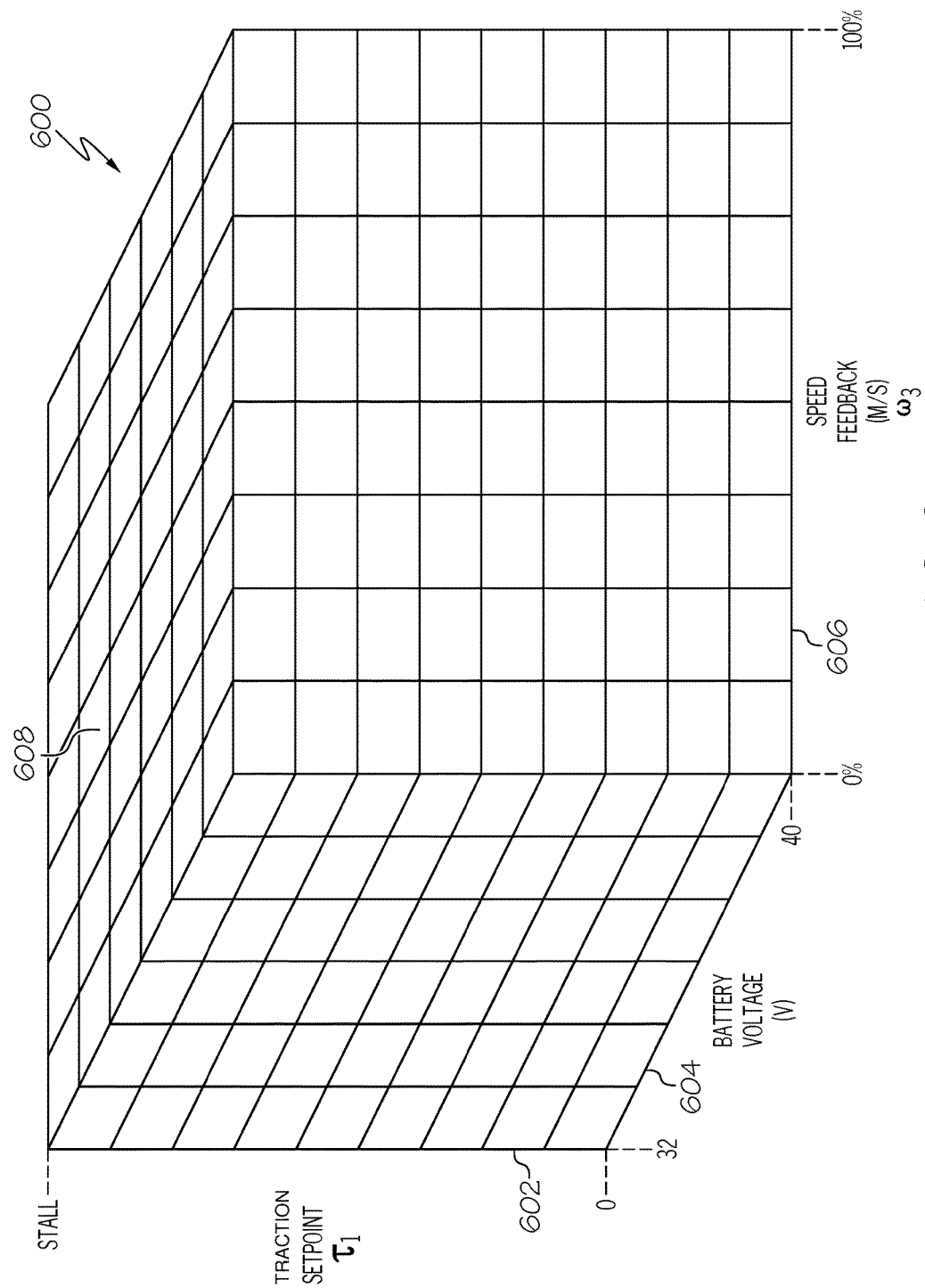
FIG. 6 illustrates an example look up table for an empirically based traction model utilized in accordance with the principles of the present invention.

A second type of model that may be used by one or both of the diagnostic supervisors 250, 252 is an empirically-based model that includes the lookup table depicted in FIG. 6. Similar to developing the transfer function model, an isolated traction system can be tested and characterized under a plurality of operating conditions by controlling inputs, such as battery voltage and load, and recording the corresponding outputs, such as current, torque and speed. A look up table(s) LUT(s) can then be filled with the test data to provide the proper input-to-output relationship such that the traction command is used as the LUT input and the output is the resulting motor speed or torque. While such a technique is possible for collecting all the data for all the various possible operating conditions of interest, other more practical techniques are presently known to one of ordinary skill in this technology field, which may be used to develop a third alternative. The motor characterization, discussed above, allows for the estimation of motor resistance, inductance and flux linkage properties. Various simulation and estimation techniques, e.g., MATLAB, can be used to develop 5-parameter or 7-parameter models (see "Modern Power Electronics and AC Drives," by Bimal K. Bose, the disclosure of which is incorporated herein by reference), for example, of a particular three phase induction motor. The resulting model represents the interrelationships between the different parameters of the motor in operation. The model is used to compute a predicted motor response to a plurality of input conditions to verify previous collected test data or used in whole as a traction motor model. The verified data can then be used to construct look-up-tables (LUT) from which a three-dimensional lookup table 600 of FIG. 6 is constructed and which forms part of the first model 254 in the illustrated embodiment.

The inputs to the lookup table 600 are the operating vehicle battery voltage, a motor speed feedback value $\omega_3$, and a traction command or traction setpoint $\tau_1$ value. The output of the lookup table 600 is an applied torque value. The battery voltage can be measured in volts and range between a voltage (e.g., 32V) below a nominal battery voltage (e.g., 36V) of a vehicle to a voltage (e.g., 40V) above that nominal voltage. The speed feedback value can be either a speed of the traction motor (e.g., RPMs) or the speed of the traction wheel (e.g., m/sec) and range from 0% of a maximum speed to 100% of the maximum speed. The traction command or traction setpoint, as well as the applied torque value, can be a torque value measured in Nm and range from 0 to an amount that will stall the traction motor. The applied torque value is an amount of modeled torque realized by the traction motor that is applied to the traction wheel/load under a particular set of battery voltage, speed, and traction setpoint values.

As mentioned above, the collected or modeled data can be arranged in a three-dimensional lookup table 600 of FIG. 6. Each particular cell 608 of the table 600 is addressable by a first coordinate on the traction setpoint axis 602, a second coordinate on the battery voltage axis 604, and a third coordinate of the speed feedback axis 606. A diagnostic supervisor can use, for instance, the lookup table 600 which defines part of the first model 254 in the illustrated embodiment, the present actual truck values for a traction setpoint $\tau_1$, the speed feedback $\omega_3$, and a battery voltage to identify one cell 608 of the lookup table 600. The output value of that cell 608 is one of the output torque values collected during empirical testing or modeled applied torque values for an amount of torque which should be presently being applied by the traction motor 264 to the traction wheel for a particular set of coordinate values (i.e., traction setpoint, battery voltage, and speed). As described more fully below, this applied torque value selected from the lookup table of FIG. 6, if applied to an actual vehicle's traction wheel should produce a vehicle speed, which in FIG. 2B is the virtual speed value $\omega_5$ output by the first model 254. As discussed above, a comparison between the virtual speed value $\omega_5$ and the speed feedback value $\omega_3$ can be used by the first diagnostic supervisor 250 to determine if the traction system of the vehicle is in a fault condition.

In summary, the traction system models described herein can be represented as a transfer function (TF), a lookup table, or a 5, 7 parameter model (ParModel). In any case, the model represents an input to output relationship where the inputs are values such as, for example, the traction setpoint $\tau_1$, battery voltage, and a current traction speed while the output is a virtual, or expected, traction speed value. Thus, in general, any one of the three traction model implementations discussed above may be selected when evaluating a current operating condition of the truck. Input values appropriate for the selected model are first determined. For example, for the first model 254, the traction setpoint $\tau_1$, the operating vehicle battery voltage, and the motor speed feedback value $\omega_3$ may be used as inputs. For the second model 256, the traction speed setting $\omega_4$ from the traction application 208 can be used as the input to a transfer function. Regardless of the model implementation selected, the output of the model is a virtual response (e.g., $\omega_5$ or $\omega_6$) that can be compared with the speed feedback value $\omega_3$ to determine if the traction system of the vehicle is in a fault condition.

Figure 9:
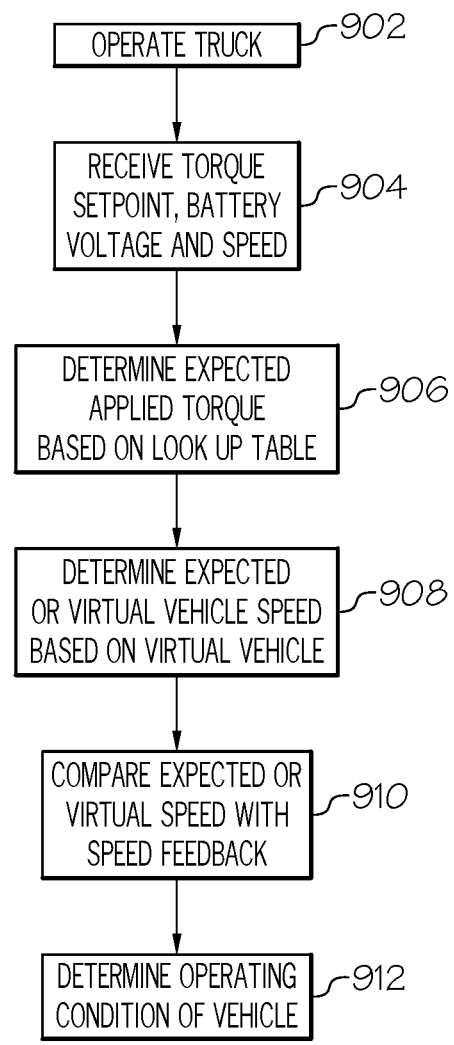
FIG. 9 is a flowchart of an example method of utilizing an empirically based model in accordance with the principles of the present invention.

FIG. 9 is a flowchart of an example method of utilizing an empirically based model, such as the LUT of FIG. 6, in accordance with the principles of the present invention. In step 902, a vehicle is being operated and the first diagnostic supervisor 250, for example, can receive, in step 904, from various sensors and other components of the vehicle the traction setpoint $\tau_1$, the vehicle's present battery voltage, and the vehicle present Trx_Speed or speed feedback $\omega_3$. These values can then be used, in step 906, to identify or compute the output of a traction module such as identifying one of the cells of the three-dimensional lookup table of FIG. 6. The speed feedback value $\omega_3$ could, for example, be a traction wheel speed measured in m/s or a traction motor rotational speed measured in RPMs. As noted above, the traction wheel speed and traction motor rotational speed are related by a scaling factor that relates to the gearing ratio of mechanical linkages between the traction motor and the traction wheel of the vehicle and the circumference of the traction wheel. The output from the traction model, such as the one particular cell identified from the lookup table of FIG. 6, provides a value that represents an expected "torque applied" value that would be applied by the traction motor to drive the traction wheel of the vehicle.

In step 908, this "torque applied" value is then used to determine an expected, or virtual, speed that would result if applied by the traction motor to the traction wheel of a vehicle in which the VCM 200 is incorporated. In particular and in accordance with one embodiment of the present invention, the operation of such a vehicle can be modeled by the equation:

$$\tau_{applied} = \frac{d\omega_3}{dt}I + \omega_5 B + \tau_{load}$$

where:
$\tau_{applied}$ is the modeled torque applied by the traction motor to the traction wheel and equals the "torque applied" value from the lookup table (or traction model);

$$\frac{d\omega_3}{dt}$$

is the change in the speed feedback W3 of the traction motor or traction wheel and can be calculated by the traction application from a sequence of recent values of the speed feedback $\omega_3$;
I is an inertia value of all elements of the vehicle and load that are being accelerated, and is a fixed value for a particular vehicle;
$\omega_5$ is a virtual rotational speed (e.g., in RPMs) of the traction motor;
B is a rolling resistance or friction of the vehicle and can be determined, for example, from a lookup table that provided a resistance value based on a weight of the vehicle and the speed of the vehicle and represents friction loss such as that caused by bearings, various couplings, the floor and vehicle tire(s); and
$\tau_{load}$ represents the weight in torque units of the operator, the vehicle and the load on its forks.

The above equation forms part of the first model 254 in a first embodiment and can be solved for speed $\omega_5$ in order to determine an expected, or virtual value, of rotational speed of the traction motor or traction wheel that is expected to result if the "torque applied" value from the lookup table (or traction model) were applied to the traction wheel.

The above equation is in terms of torques and angular velocities but could also be converted to an equivalent equation in terms of linear velocities and linearly-applied forces. The conversion of a torque to a linearly applied force can be accomplished by scaling the torque value based on a) a gear ratio between the traction motor and the traction, or driven, wheel and b) a diameter of the traction, or driven, wheel.

Hence, in accordance with another embodiment of the present invention, the operation of the vehicle in which the VCM is incorporated can be modeled by an equation scaled from the above torque-based equation (e.g., Nm) to a linear-based force equation $$\left(\text{e.g., } N \text{ or } \frac{\text{kg} \cdot \text{m}}{s^2}\right)$$

such that:

$$F_{applied} = \text{Acc} \cdot m + v_5 B + F_{load}$$

which can be solved for a linear vehicle speed "$v_5$" resulting from an applied force and the value "$v_5$" is the virtual linear speed calculated by the first diagnostic supervisor 250 in FIG. 2B.

In the above equation, which forms part of the first model 254 in a second embodiment:
$F_{applied}$ is a linearly applied force determined by scaling the modeled torque applied value $\tau_{applied}$ from the lookup table 600 based on a) a gear ratio between the traction motor and the traction, or driven, wheel and b) a diameter of the traction, or driven, wheel;
Acc is a linear acceleration equal to the change in the linear velocity of the traction wheel and is equivalent to $d\omega_3/dt$ scaled by a) a gear ratio between the traction motor and the traction, or driven, wheel and b) a diameter of the traction, or driven, wheel;
m is the mass of all elements of the vehicle and load that are being accelerated;
B is a rolling resistance or friction of the vehicle and can be determined, for example, from a lookup table that provides a resistance value based on a weight of the vehicle and the speed of the vehicle; and
$F_{load}$ is the weight of the vehicle, the load on its forks and the operator.

Thus, in step 910, the virtual value $\omega_5$ or virtual linear speed value $v_5$, can be compared with an actual vehicle speed $\omega_3$, or actual linear speed $v_3$, so that an operating condition of the vehicle can be determined in step 912.

Figure 10A:
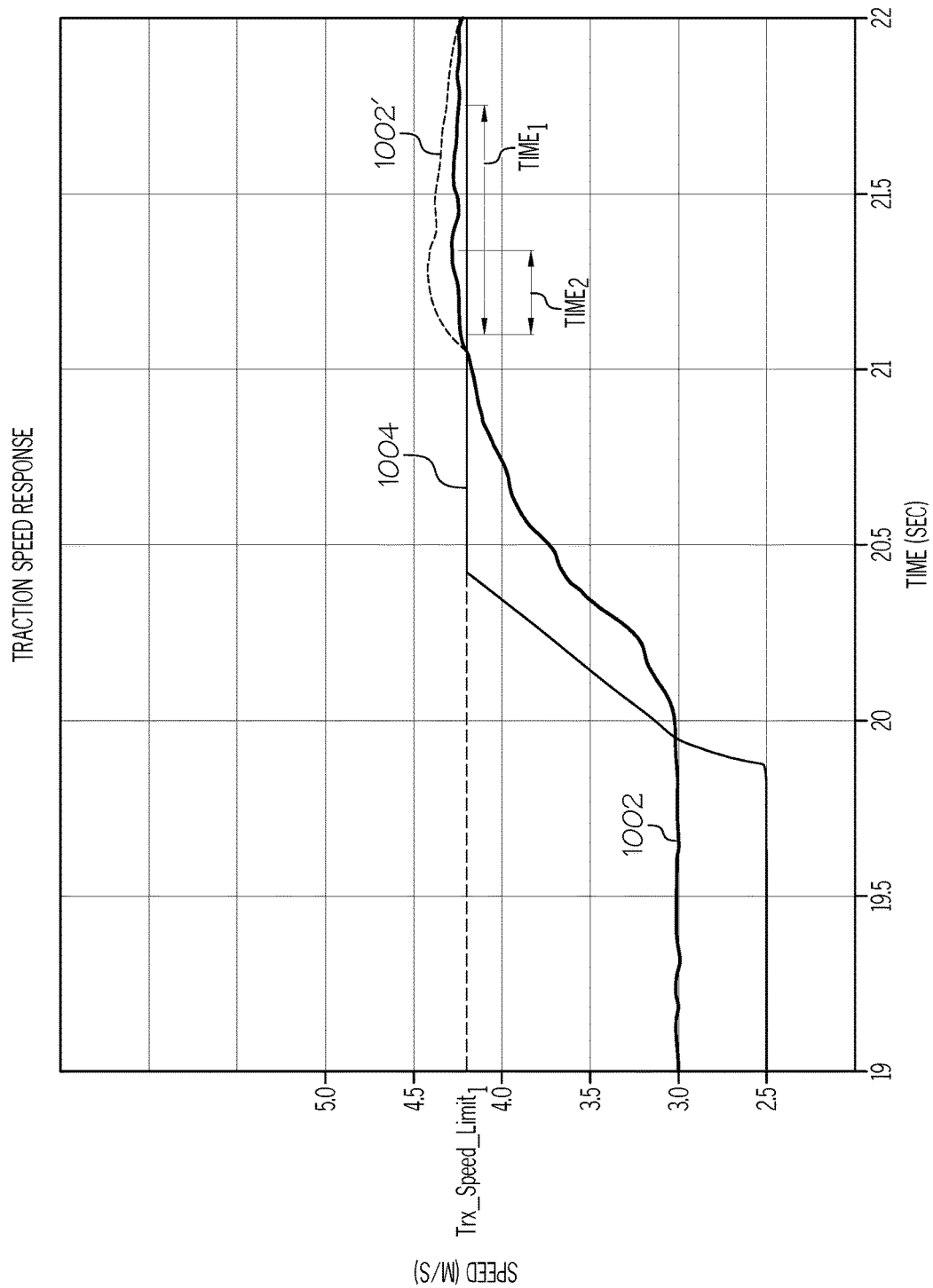
FIG. 10A is an example of a response of an actual vehicle traction system to a changing speed setpoint.

In another example, one or more diagnostic comparisons can be performed by a model that utilizes timing constraints and signal thresholds for comparison to the actual response from the TCM 258. Such a model, for example, is depicted in FIG. 11 as a third model 1254 used by the first diagnostic supervisor 250 in place of the first model 254. Inputs to the third model 1254 and/or the first diagnostic supervisor 250 can include the speed feedback $\omega_3$ and the Trx_Speed_Limit$_1$, 1202 provided by the steering application 206. For instance such a model could rely on known or measured attributes of the response of an actual traction system of a vehicle such as is shown in FIG. 10A. The x-axis, in FIG. 10A represents time and the y-axis is a speed (e.g., m/s). In response to a traction speed setting $\omega_4$, 1004 defining a traction setpoint provided by the traction application 208 to the TCM 258, a measured response of the traction wheel or traction motor speed of the vehicle is shown by the graph 1002. By analyzing the two signals 1002, 1004, a determination can be made, for example, about how long it takes the actual traction speed 1002 to reach the traction speed setting 1004. Additionally, the two signals 1002, 1004 reveal that a difference between the actual traction wheel speed 1002 and the traction speed setting never exceeds some threshold amount. As explained below with respect to FIG. 10B, these characteristics of the traction system response to one or more operational inputs received by the vehicle can be relied upon to construct a number of "cross-checks" that may indicate whether the traction system of an operating vehicle is in a fault condition. Two example operational inputs that can be received by the vehicle are shown in FIG. 2B as the steering control input signal 278 and the traction speed control input signal 260 which are directly, or indirectly, used by the VCM 200 to generate the traction speed setting $\omega_4$.

Figure 10B:
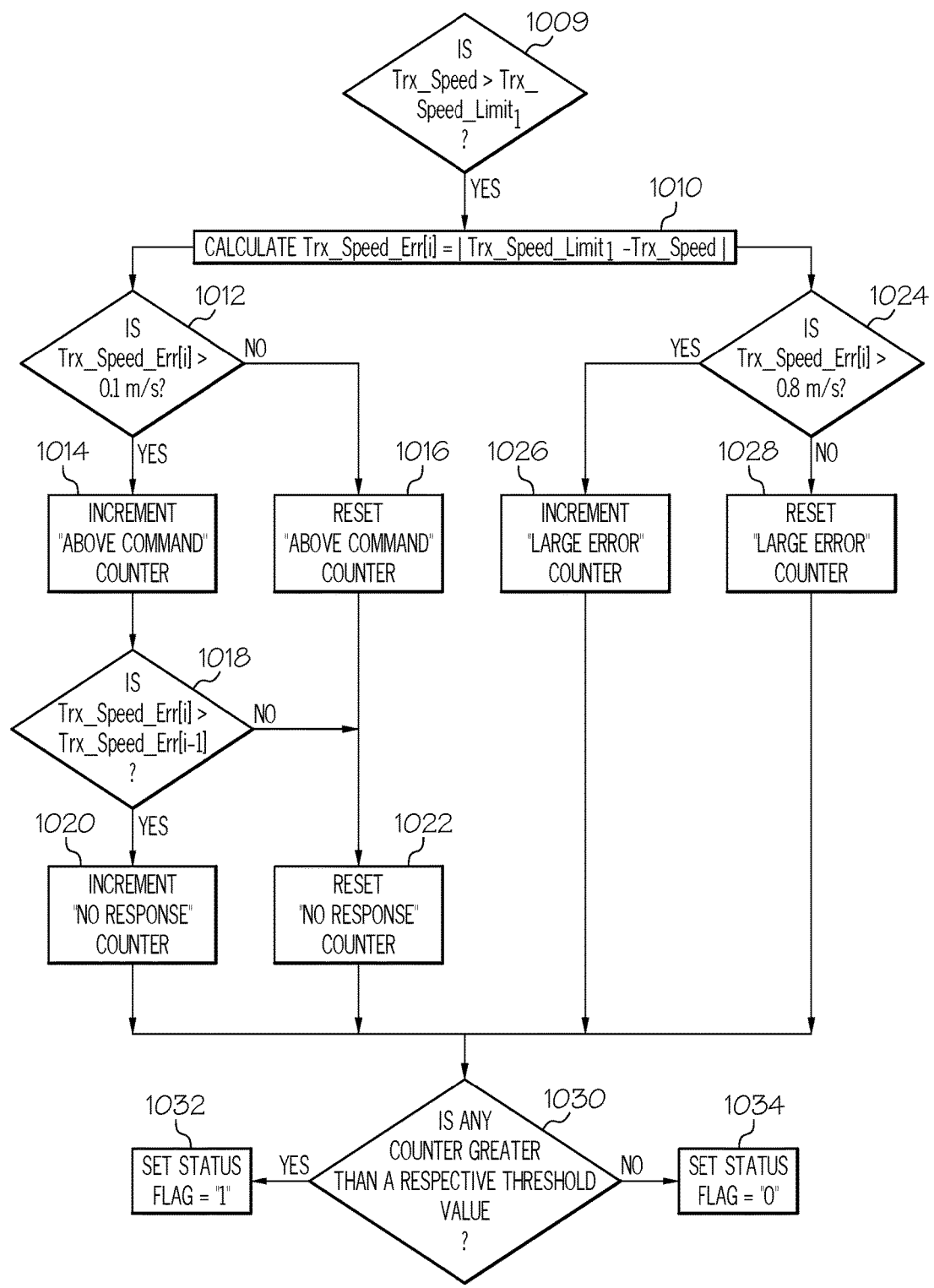
FIG. 10B is a flowchart of an example method of determining whether a vehicle traction system is in a fault condition in accordance with the principles of the present invention.
Figure 11:
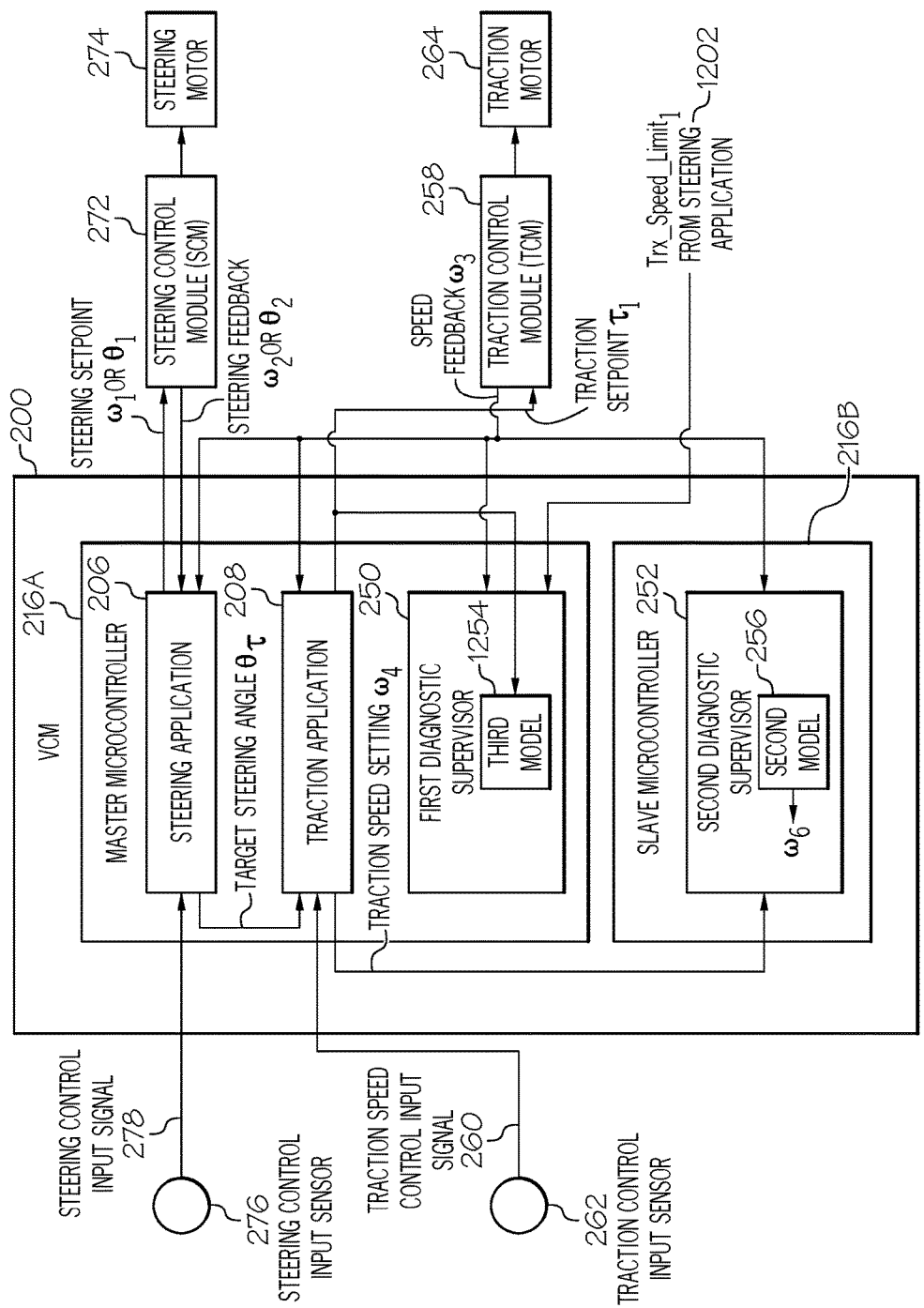
FIG. 11 schematically illustrates selected features of a vehicle and an example vehicle control module that are helpful in describing other model-based diagnostic techniques that utilize an alternative traction model in accordance with the principles of the present invention.

FIG. 10B is a flowchart of an example method of determining whether a vehicle traction system is in a fault condition in accordance with the principles of the present invention. In the embodiment illustrated in FIG. 11, the first diagnostic supervisor 250 receives the Trx_Speed (i.e., speed feedback $\omega_3$) and the Trx_Speed_Limit$_1$, which Trx_Speed_Limit$_1$ is calculated and provided by the steering application 206 to the diagnostic supervisor 250. In the example embodiment of FIG. 11, the first supervisor 250 includes this third model 1254 as defined by the flowchart in FIG. 10B. In step 1009, an initial determination is made if the present Trx_Speed is greater than the Trx_Speed_Limit$_1$. If so, then the remaining diagnostic steps of FIG. 10B are performed. If not, then none of the steps are performed and the steps of FIG. 10B are skipped until the VCM 200 operates to once again perform step 1009. In step 1010, a Trx_Speed_Err is calculated that is the absolute difference between the Trx_Speed_Limit$_1$ from the steering application and the present Trx_Speed of the vehicle. In particular, the steps in the flowchart of FIG. 10B can be executed within the first supervisor 250 of FIG. 11 as part of a looping software application such that step 1010 could, for example, be repeated every 10 ms. Thus, the Trx_Speed_Err as shown in FIG. 10B is labeled as Trx_Speed_Err[i] to indicate that it is the Trx_Speed_Err value for a current iteration of the method of FIG. 10B. In step 1012, a determination is made whether or not the Trx_Speed_Err[i] is greater than some first "difference threshold" amount. For example, that threshold may be 0.1 m/s. If this is the case, then this indicates that the Trx_Speed is greater than the Trx_Speed_Limit$_1$ by an amount that may raise concerns regarding operation of the vehicle's traction system, i.e., the first threshold amount. There can be a counter associated with this condition labeled the "Above Command" counter. When the determination in step 1012 is true, the "Above Command" counter is incremented in step 1014. If the determination in step 1012 is not true, then the "Above Command" counter can be reset to, or remain at, "0" in step 1016.

In step 1018 a determination is made whether the present iteration Trx_Speed_Err[i] value is greater than or equal to the previous iteration's Trx_Speed_Err[i−1]. If this condition is true, then the Trx_Speed is greater than the Trx_Speed_Limit$_1$ and, furthermore, diverging from the Trx_Speed_Limit$_1$. A "No Response" counter can be associated with this condition such that whenever the determination in step 1018 is true, the "No Response" counter is incremented in step 1020. If either the determination in step 1012 or the determination in step 1018 is not true, then the "No Response" counter is set to, or remains at, "0" in step 1022.

In step 1024, a determination is made whether or not the Trx_Speed_Err[i] is greater than a second, larger "difference threshold" amount such as, for example, 0.8 m/s. A "Large Error" counter can be associated with this condition and incremented, in step 1026, when the determination in step 1024 is true. When the determination in step 1024 is not true, then the "Large Error" counter can be set to, or remain at, "0" in step 1028.

Each of the "Above Command", "No Response", and "Large Error" counters can have an associated counter limit, or "counter threshold" that is reflective of how long each of the three conditions described above are allowed to exist before the diagnostic supervisor determines that the vehicle's traction system is likely in a fault condition. Thus, after each of the three counters are adjusted during a current iteration of the method of FIG. 10B, the counters can be compared to their respective counter limit or threshold. The combination of repeatedly calculating a difference value in step 1010 and comparing each of the three counters to a respective counter threshold value results in the determination of a fault condition being made based on a plurality, or a set, of the different difference values rather than a single instance of a present difference value.

For example, the "Above Command" counter threshold may be 300 and if, as assumed above, the flowchart of FIG. 10B repeats about every 10 ms, then the limit of 300 is analogous to a time period of about 3 seconds. The "Large Error" counter threshold may be a lower amount than 300 such as, for example, 170 so that the time period associated with that condition is smaller, e.g., 1.7 seconds. The "No Response" counter threshold may be smaller yet such as, for example, 50.

In step 1030 a determination is made whether any of the three counters exceed their respective counter threshold. If the determination in step 1030 is true, then a status flag is set, in step 1032, to a first value (e.g., "1"). If the determination in step 1030 indicates that all three counters are at or below their respective counter threshold, then the status flag is set, in step 1034, to a second value (e.g., "0"). If the status flag is set to the first value, then the diagnostic supervisor may determine that the operating condition of the vehicle traction system is in a fault condition. If the status flag is set to the second value, then the diagnostic supervisor may determine that the operating condition of the vehicle traction system is not in a fault condition.

The predetermined values such as 0.1 m/s in step 1012, 0.8 m/s in step 1024 and the counter thresholds in step 1030 can be based on the actual response 1002 of an operating vehicle to an operator's input. FIG. 5 illustrated a hypothetical response of a vehicle traction system that was useful for developing a transfer function model of that system. As mentioned above, FIG. 10A illustrates data collected from an actual vehicle that characterizes its response 1002 to an operator's input. The signal 1004 represents a traction speed setpoint $\omega_4$ and the signal 1002 represents the traction speed W3 of the vehicle. Based on a Wheel_Angle_Cmd, there may also be a $Trx\_Speed\_Limit_1$ value. The response signal 1002 is that of a properly functioning vehicle and does not clearly show any anomalies or malfunctions of the vehicle's traction system. Accordingly, a hypothetical signal 1002' is shown in phantom that illustrates at least some of the determinations discussed with respect to FIG. 10B.

Analysis of the different signals of FIG. 10A reveals there is a time period time' that begins when the response signal 1002' exceeds the $Trx\_Speed\_Limit_1$ plus an example "difference threshold" of 0.1 m/s. In FIG. 10A, the hypothetical response signal 1002' reveals that the time period time' is about 0.7 second before the signal 1002' settles to a value substantially equal to the $Trx\_Speed\_Limit_1$, i.e., within 0.1 m/s, the "difference threshold" of step 1012. A maximum allowable length of the time period time' corresponds to the counter threshold value "300" for the "Above Command" counter. If that counter were to reach 300, which would correspond to the period time' reaching 3 seconds, for example, then the diagnostic supervisor would determine that the vehicle's traction system was malfunctioning.

One example malfunction that might lead to the "Above Command" counter reaching 300 is if communication between the traction application 208 and the TCM 258 is not occurring. As explained above with respect to FIGS. 4A-4D, if the steering application 206 determines a lower $Trx\_Speed\_Limit_1$ is appropriate given a vehicle's current operating conditions, then traction application 208 may also provide a traction setpoint $\tau_1$ which is intended to slow the vehicle. If communication is broken between the traction application 208 and the TCM 258, then the vehicle speed may not decrease and may exceed the $Trx\_Speed\_Limit_1$ by at least 0.1 m/s for a period of time that allows the "Above Command" counter to reach 300.

A second time period $time_2$ represents a period of time in which the response signal 1002 is greater than the $Trx\_Speed\_Limit_1$ by the example threshold amount of 0.1 m/s and is increasing. These conditions exist when step 1018 in FIG. 10B is true. A maximum allowable length of the time period $time_2$ corresponds to the threshold value "50" for the "No Response" counter. If that counter were to reach 50 which would correspond to the period $time_2$ reaching 0.5 seconds for example, then the diagnostic supervisor would determine that the vehicle's traction system was malfunctioning.

As mentioned, the response signal 1002 of FIG. 10A is that of a properly functioning vehicle traction system. Thus, the signal 1002 does not exceed the "large Error" threshold value of 0.8 m/s that is tested in step 1024 of FIG. 10B. However, the "Large Error" counter threshold of "170" would correspond to a maximum time period (not shown) that the signal 1002 could exceed the $Trx\_Speed\_Limit_1$ by that second example threshold amount of 0.8 m/s before the diagnostic supervisor would, in step 1032, indicate that the vehicle's traction system was in a fault condition.

Thus, the values 0.1 m/s and 0.8 m/s for the "Above Command" and "Large Error" determination, respectively, are based on a vehicle's traction system response to an operator's input. For example, the actual response signal 1002 can be tested and observed for a statistically significant number of examples (e.g., one or more examples) to determine that it typically settles within about 0.1 m/s of the $Trx\_Speed\_Limit_1$ for a particular vehicle's traction system. Also, analysis of those examples of the response signal 1002 may reveal that while overshoot is very likely to occur, overshoot that exceeded 0.8 m/s rarely happened and could empirically be linked to a traction system failure. Similarly, the threshold values for the counters (e.g., 300, 170, 50) are also based on the actual response of a vehicle's traction system to an operator's input. One of ordinary skill will recognize that these values are provided by way of example and other specific values would be appropriate for different and varying vehicles. The "300" can be used in conjunction with a processing loop speed (e.g., every 10 ms) so that the threshold corresponds to a time period. If, for example, an operating condition is tested every 10 ms and a "true" result increments a counter, then that counter reaching 300 corresponds to the operating condition being "true" for the previous 3 seconds. Thus, instead of any of the conditions tested in steps 1012, 1018 or 1024 immediately resulting in a determination of a fault condition, the threshold values represent how long a respective one of the conditions may last before a fault condition is determined. Analysis of a statistically significant number of examples (e.g., one or more examples) of actual response signal 1002 can reveal that the time taken for the signal 1002 to settle within 0.1 m/s of the $Trx\_Speed\_Limit_1$ rarely if ever exceeds 3 seconds. One of ordinary skill will recognize that these values are provided by way of example and other specific values would be appropriate for different and varying vehicles.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method comprising:
    receiving, by a steering application executing on a vehicle control module:
       a steering control input to control a steered wheel of a vehicle;
    based on the steering control input, determining, by the steering application:
       a traction threshold value associated with a traction control attribute related to a traction wheel of the vehicle;
    receiving by a first diagnostic supervisor executing on the vehicle control module:
       a measured value of the traction control attribute, and the traction threshold value;
    when the measured value of the traction control attribute exceeds the traction threshold value, repeatedly calculating, by the first diagnostic supervisor, a respective difference between the traction threshold value and the measured value of the traction control attribute, to generate a set comprising a plurality of the respective differences; and
    based on the plurality of respective differences, determining, by the first diagnostic supervisor, a first operating condition of a traction system of the vehicle.

2. The method of claim 1, comprising:
    for each respective difference:
       determining if the difference is greater than a difference threshold;
       when the difference is greater than the difference threshold, incrementing a first counter value; and
       when the difference is less than or equal to the difference threshold, resetting the first counter to a first initial value.

3. The method of claim 2, comprising:
    determining a fault condition of the traction system has occurred when the first counter value is greater than a first counter threshold.

4. The method of claim 2, wherein the first counter threshold and the difference threshold are based on response characteristics of the traction system to at least one operational input received by the vehicle.

5. The method of claim 1, wherein the traction threshold value comprises a traction speed limit.

6. The method of claim 1, comprising:
for each respective difference:
  determining if the difference is greater than a difference threshold;
  when the difference is greater than the difference threshold, incrementing a first counter value;
  when the difference is less than or equal to the difference threshold, resetting the first counter to a first initial value;
  determining if the difference is greater than an immediately preceding difference in the set of respective differences;
  when the difference is greater than the immediately preceding difference, incrementing a second counter value; and
  when the difference is less than or equal to the immediately preceding difference, resetting the second counter value to a second initial value.

7. The method of claim 6, comprising:
determining a fault condition of the traction system has occurred when either the first counter value is greater than a first counter threshold or the second counter value is greater than a second counter threshold.

8. The method of claim 7, wherein the first counter threshold, the second counter threshold and the difference threshold are based on response characteristics of the traction system to at least one operational input received by the vehicle.

9. The method of claim 1, comprising:
for each respective difference:
  determining if the difference is greater than a first difference threshold;
  when the difference is greater than the first difference threshold, incrementing a first counter value,
  when the difference is less than or equal to the first difference threshold, resetting the first counter to a first initial value;
  determining if the difference is greater than a second difference threshold;
  when the difference is greater than the second difference threshold, incrementing a second counter value; and
  when the difference is less than or equal to the second difference threshold, resetting the second counter to a second initial value.

10. The method of claim 9, comprising:
determining a fault condition of the traction system has occurred when either the first counter value is greater than a first counter threshold or the second counter value is greater than a second counter threshold.

11. The method of claim 10, wherein the first counter threshold, the second counter threshold, the first difference threshold, and the second difference threshold are based on response characteristics of the traction system to at least one operational input received by the vehicle.

12. A vehicle control system comprising:
a controller comprising:
  a first input configured to receive a steering control input to control a steered wheel of a vehicle,
  a second input configured to receive a measured value of a traction control attribute related to a traction wheel of the vehicle, and
  a third input configured to receive a traction speed control input to control the traction wheel of the vehicle;
a memory coupled with the controller and storing code executable by the controller;
the executable code comprising a steering application configured to:
  receive the steering control input to control the steered wheel of the vehicle, and
  determine, based on the steering control input, a traction threshold value associated with the traction control attribute related to the traction wheel of the vehicle; and
the executable code comprising a diagnostic supervisor configured to:
  a) receive:
    a measured value of the traction control attribute, and
    the traction threshold value;
  b) repeatedly calculate, when the measured value of the traction control attribute exceeds the traction threshold value, and a respective difference between the traction threshold value and the measured value of the traction control attribute, to generate a set comprising a plurality of the respective differences; and
  c) determine, based on the plurality of respective differences, a first operating condition of a traction system of the vehicle.

13. The system of claim 12, wherein the diagnostic supervisor is configured to:
for each respective difference:
  determine if the difference is greater than a difference threshold;
  when the difference is greater than the difference threshold, increment a first counter value; and
  when the difference is less than or equal to the difference threshold, reset the first counter to a first initial value.

14. The system of claim 13, wherein the diagnostic supervisor is configured to:
determine a fault condition of the traction system has occurred when the first counter value is greater than a first counter threshold.

15. The system of claim 14, wherein the first counter threshold and the difference threshold are based on response characteristics of the traction system to at least one operational input received by the vehicle.

16. The system of claim 12, wherein the traction threshold value comprises a traction speed limit.

17. The system of claim 12, wherein the diagnostic supervisor is configured to:
for each respective difference:
  determine if the difference is greater than a difference threshold;
  when the difference is greater than the difference threshold, increment a first counter value;
  when the difference is less than or equal to the difference threshold, reset the first counter to a first initial value;
  determine if the difference is greater than an immediately preceding difference in the set of respective differences;

when the difference is greater than the immediately preceding difference, increment a second counter value; and when the difference is less than or equal to the immediately preceding difference, reset the second counter value to a second initial value.

18. The system of claim 17, wherein the diagnostic supervisor is configured to:

determine a fault condition of the traction system has occurred when either the first counter value is greater than a first counter threshold or the second counter value is greater than a second counter threshold.

19. The system of claim 18, wherein the first counter threshold, the second counter threshold and the difference threshold are based on response characteristics of the traction system to at least one operational input received by the vehicle.

20. The system of claim 12, wherein the diagnostic supervisor is configured to:

for each respective difference:
  determine if the difference is greater than a first difference threshold;
  when the difference is greater than the first difference threshold, increment a first counter value; and
  when the difference is less than or equal to the first difference threshold, reset the first counter to a first initial value;
  determine if the difference is greater than a second difference threshold;
  when the difference is greater than the second difference threshold, increment a second counter value; and
  when the difference is less than or equal to the second difference threshold, reset the second counter to a second initial value.

21. The system of claim 20, wherein the diagnostic supervisor is configured to:

determine a fault condition of the traction system has occurred when either the first counter value is greater than a first counter threshold or the second counter value is greater than a second counter threshold.

22. The system of claim 21, wherein the first counter threshold, the second counter threshold, the first difference threshold, and the second difference threshold are based on response characteristics of the traction system to at least one operation.

* * * * *

UNITED STATES PATENT AND TRADEMARK OFFICE
CERTIFICATE OF CORRECTION

PATENT NO. : 9,868,445 B2
APPLICATION NO. : 15/234152
DATED : January 16, 2018
INVENTOR(S) : Stephen T. Mangette et al.

Page 1 of 2

It is certified that error appears in the above-identified patent and that said Letters Patent is hereby corrected as shown below:

In the Claims

Column 17, Line 60, "point can be set to Wheel_Ang_Cmd in step 412" should read --point can be set to Wheel_Angle_Cmd in step 412--

Column 17, Line 65, "Wheel_ ngle performed in step 416." should read --Wheel_Angle performed in step 416.--

Column 18, Line 40, "second Trx_Speed_Limit for the traction" should read --second Trx_Speed_Limit2 for the traction--

Column 22, Line 13, "two variable can be also be calculated according to:" should read --two variable can also be calculated according to:--

Column 22, Lines 16-18, "$C\_xy=1/10(\Sigma\_(i=1)^{\wedge}10\ (\ (x\_i-(\ X\ )^{-})(y\_i-(\ Y\ )^{-}))$" should read --$C\_xy=1/10(\Sigma\_(i=1)^{\wedge}10\ (\ (x\_i-(\ X\ )^{-})(y\_i-(\ Y\ )^{-})))$--

Column 27, Line 57, "is the change in the speed feedback W3 of the traction" should read --is the change in the speed feedback ω3 of the traction--

Column 30, Lines 66-67, "represents the traction speed W3 of the vehicle." should read --represents the traction speed ω3 of the vehicle.--

Column 31, Line 8, "is a time period time' that begins" should read --is a time period time1 that begins--

Column 31, Line 11, "reveals that the time period time' is" should read --reveals that the time period time1 is--

Column 31, Line 15, "allowable length of the time period time' corresponds to" should read Signed and Sealed this
Fourth Day of June, 2019

Andrei Iancu
*Director of the United States Patent and Trademark Office*

CERTIFICATE OF CORRECTION (continued)
U.S. Pat. No. 9,868,445 B2

--allowable length of the time period time1 corresponds to--

Column 31, Line 18, "correspond to the period time' reaching 3 seconds" should read --correspond to the period time1 reaching 3 seconds--